(12) United States Patent
Meyer et al.

(10) Patent No.: US 6,768,980 B1
(45) Date of Patent: Jul. 27, 2004

(54) METHOD OF AND APPARATUS FOR HIGH-BANDWIDTH STEGANOGRAPHIC EMBEDDING OF DATA IN A SERIES OF DIGITAL SIGNALS OR MEASUREMENTS SUCH AS TAKEN FROM ANALOG DATA STREAMS OR SUBSAMPLED AND/OR TRANSFORMED DIGITAL DATA

(76) Inventors: Thomas W. Meyer, 315 So. Coast Hwy. 101, Suite U, #63, Encinitas, CA (US) 92024; Josslyn Motha Meyer, 315 So. Coast Hwy. 101, Suite U, #63, Encinitas, CA (US) 92024

( * ) Notice: Subject to any disclaimer, the term of this patent is extended or adjusted under 35 U.S.C. 154(b) by 630 days.

(21) Appl. No.: 09/611,151

(22) Filed: Jul. 6, 2000

Related U.S. Application Data

(63) Continuation-in-part of application No. 09/389,941, filed on Sep. 3, 1999, and a continuation-in-part of application No. 09/389,942, filed on Sep. 3, 1999.

(51) Int. Cl.$^7$ .............................. H04B 1/66; H04N 7/24
(52) U.S. Cl. ........................ 704/500; 382/248; 382/251
(58) Field of Search ................................ 704/500, 501, 704/503; 382/100, 239, 248, 251; 713/176

(56) References Cited

U.S. PATENT DOCUMENTS

| | | | | |
|---|---|---|---|---|
| 5,778,102 A | * | 7/1998 | Sandford et al. | 382/251 |
| 5,889,868 A | * | 3/1999 | Moskowitz et al. | 713/176 |
| 5,960,081 A | * | 9/1999 | Vynne et al. | 713/176 |
| 6,061,793 A | * | 5/2000 | Tewfik et al. | 713/176 |
| 6,233,347 B1 | * | 5/2001 | Chen et al. | 382/100 |
| 6,266,817 B1 | * | 7/2001 | Chaddha | 725/146 |
| 6,275,599 B1 | * | 8/2001 | Adler et al. | 382/100 |
| 6,285,774 B1 | * | 9/2001 | Schumann et al. | 382/100 |
| 6,332,030 B1 | * | 12/2001 | Manjunath et al. | 382/100 |
| 6,345,100 B1 | * | 2/2002 | Levine | 380/205 |
| 6,354,630 B1 | * | 3/2002 | Zhang et al. | 283/70 |
| 6,363,209 B2 | * | 3/2002 | Sako et al. | 386/94 |
| 6,522,769 B1 | * | 2/2003 | Rhoads et al. | 382/100 |

OTHER PUBLICATIONS

Kalker et al., "Watermark estimation through detector analysis," International Conference on Image Processing, Oct. 4–7, 1998, vol. 1, pp. 425 to 429.*

* cited by examiner

*Primary Examiner*—Richemond Dorvil
*Assistant Examiner*—Martin Lerner
(74) *Attorney, Agent, or Firm*—Rines and Rines

(57) ABSTRACT

A novel technique for high-bandwidth steganographic embedding of supplemental data in a series of digital signals or measurements, such as taken from analog data streams or subsampled and/or transformed digital data, wherein the series of measurements are derived through functional transformations and involving quantization and/or aliasing, with the supplemental data bits modulating or modifying the quantized and/or aliased components with only slight adjustments thereof to embed the supplemental data without substantially affecting the quality of the measurements; and all, preferably, through not exclusively, with the use of least-significant-bit parity encoding designed to choose the appropriate components to be so modulated or modified

36 Claims, 22 Drawing Sheets

Data Encoding Through Modulation of Quantization

Data Encoding System Overview

Data Encoding Using Steganographic Techniques

Using Watermarking with Encoding

Original Signal

Compressed, Co-efficient Based
Representation of Signal (In this case
using a Fourier-Based Representation)

| Frequency | Amplitude | Phase |
|---|---|---|
| 1000 | 12 | 10 |
| 1200 | 15 | 6 |
| 1450 | 5 | 12 |
| 1600 | 3 | 1 |

Coefficient-Domain Parity Encoding

Encoding Data in an Audio File

Encoding Data in an Image File

Encoding Data in a Video File

Encoding Data in a 2D or 3D Spline

Data Encoding System Overview

Data Extraction System Overview

Data Extraction into Media Environment

Using Watermarking with Encoding

Data Encoding Through Modulation of Quantization

Data Encoding Through Modulation of Aliasing

Parity Encoding

Variable Rate Data Encoding

Pre-Computation for Dynamic Embedding

Parity Decoding

METHOD OF AND APPARATUS FOR HIGH-BANDWIDTH STEGANOGRAPHIC EMBEDDING OF DATA IN A SERIES OF DIGITAL SIGNALS OR MEASUREMENTS SUCH AS TAKEN FROM ANALOG DATA STREAMS OR SUBSAMPLED AND/OR TRANSFORMED DIGITAL DATA

Priority is claimed under the provisions of 37 CFR 1.78 on the basis of parent U.S. applications Ser. No. 09/389,941 and Ser. No. 09/389,942, filed Sep. 3, 1999, later more fully discussed, of which the present application is a continuation-in-part.

The present invention relates to the steganographic embedding of data in a series of digital signals, datastreams or measurements (hereinafter all often generically referred to as "measurements"); being more specifically, though not exclusively concerned with such "measurements" taken directly from an analog data stream, such as, for example, an audio waveform, or from subsampled and/or transformed digital data, as described in said parent U.S. applications Ser. No. 09/389,941 (Process, System, And Apparatus For Embedding Data In Compressed Audio, Image, Video And Other Media Files And The Like), and Ser. No. 09/389,942 (Process Of And System For Seamlessly Embedding Executable Program Code Into Media File Formats Such As MP3 And The Like For Execution By Digital Media Players And Viewing Systems) filed Sep. 3, 1999; the present application containing modified and supplementary material illustrating the generic concepts underlying the basic techniques of said applications.

In some aspects, this application is also useful to incorporate techniques described also in U.S. application Ser. No. 09/518,875 filed Mar. 6, 2000, for Method, Apparatus and System For Data Embedding In Digital Telephone Signals And The Like, And in Particular Cellular Phone Systems, Without Affecting The Backwards Compatibility Of The Digital Phone Signal.

BACKGROUND OF INVENTION

As explained in said parent applications, data has heretofore often been embedded in analog representations of media information and formats. This has been extensively used, for example, in television and radio applications as for the transmission of supplemental data, such as text; but the techniques used are not generally capable of transmitting high bit rates of digital data.

Watermarking data has also been embedded so as to be robust to degradation and manipulation of the media. Typical watermarking techniques rely on gross characteristics of the signal being preserved through common types of transformations applied to a media file. These techniques are again limited to fairly low bit rates. Good bit rates on audio watermarking techniques are, indeed, only around a few dozen bits of data encoded per second.

While data has been embedded in the low-bit of the single-domain of digital media enabling use of high bit rates, such data is either uncompressed, or capable of only relatively low compression rates. Many modern compressed file formats, moreover, do not use such signal-domain representations and are thus unsuited to the use of this technique. Additionally, this technique tends to introduce audible noise when used to encode data in sound files.

Among prior patents illustrative of such and related techniques and uses are U.S. Pat. No. 4,379,947 (dealing with the transmitting of data simultaneously with audio); U.S. Pat. No. 5,185,800 (using bit allocation for transformed digital audio broadcasting signals with adaptive quantization based on psychoauditive criteria ), U.S. Pat. No. 5,687,236 (steganographic techniques); U.S. Pat. No. 5,710,834 (code signals conveyed through graphic images); U.S. Pat. No. 5,832,119 (controlling systems by control signals embedded in empirical data), U.S. Pat. No. 5,850,481 (embedded documents, but not for arbitrary data or computer code); U.S. Pat. No. 5,889,868 (digital watermarks in digital data); and U.S. Pat. No. 5,893,067 (echo data hiding in audio signals).

Prior publications relating to such techniques include Bender, W. D. Gruhl, M. Morimoto, and A. Lu, "Techniques for data hiding", *IBM Systems Journal, Vol. 35, Nos. 3 & 4*, 1996, p. 313–336;

A survey of techniques for multimedia data labeling, and particularly for copyright labeling using watermark in the encoding low bit-rate information is presented by Langelaar, G. C. et al. in "Copy Protection For Multimedia Data based on Labeling Techniques" (http://www-it.et.tudelft.nl/html/research/smash/public/benlx96/benelux_cr.html).

In specific connection with the above-cited "MPEG Spec" and "ID3v2 Spec" reference applications, we have disclosed in the above-mentioned parent application Ser. No. 09/389, 942, techniques applying novel embedding concepts directed specifically to imbuing one or more of pre-prepared audio, video, still image, 3-D or other generally uncompressed media formats with an extended capability to supplement their pre-prepared presentations with added graphic, interactive and/or e-commerce content presentations at the digital media playback apparatus.

The before-mentioned other parent application Ser. No. 09/389,941 is more broadly concerned with data embedding in compressed formats, and with encoding a frequency representation of the data, typically through a Fourier Transform, Discrete Cosine Transform, Wavelet Transform or other well-known function. The invention embeds high-rate data in compressed digital representations of the media, including through modifying the low-bits of the coefficients of the frequency representation of the compressed data, thereby enabling additional benefits of fast encoding and decoding, because the coefficients of the compressed media can be directly transformed without a lengthy additional decompression/compression process. Such technique also can be used in combination with watermarking, but with the watermark applied before the data encoding process.

The earlier cited Langelaar et al publication, in turn, references and discusses the following additional prior art publications:

J. Zhao, E. Koch: "Embedding Robust Labels into Images for Copyright Protection", Proceedings of the International Congress on Intellectual Property Rights for Specialized Information, Knowledge and New Technologies, Vienna, Austria, August 1995;

E. Koch, J. Zhao: "Towards Robust and Hidden Image Copyright Labeling", Proceedings IEEE Workshop on Nonlinear Signal and Image Processing, Neos Marmaras, June, 1995; and F. M. Boland, J. J. K O Ruanaidh, C, Dautzenberg: "Watermarking Digital Images for Copyright Protection", Proceedings of the 5th International Conference on Image Processing and its Applications, No. 410, Endinburgh, July, 1995

An additional article by Langelaar also discloses earlier labeling of MPEG compressed video formats:

G. C Langelaar, R. L. Lagendijk, J. Biemond: "Real-time Labeling Methods for MPEG Compressed Video," 18*th*

*Symposium on Information Theory in the Benelux*, 15–16 May 1997, Veldhoven, The Netherlands.

These Zhao and Koch, Boland et al and Langelaar et al disclosures, while teaching encoding technique approaches having partial similitude to components of the techniques employed by the present invention, as will now be more fully explained, are not, however, either anticipatory of, or actually adapted for solving the total problems with the desired advantages that are addressed and sought by the present invention.

Considering, first, the approach of Zhao and Koch, above-referenced, they embed a signal in an image by using JPEG-based techniques. (Digital Compression and Coding of Continuous-tone Still Images, Part 1: Requirements and guidelines, ISO/IEC DIS 10918-1.) They first encode a signal in the ordering of the size of three coefficients, chosen from the middle frequency range of the coefficients in an 8-block or octet DCT. They divide eight permutations of the ordering relationship among these three coefficients into three groups: one encoding a '1' bit (HML, MHL, and HHL), one encoding a '0' bit (MLH, LMH, and LLH), and a third group encoding "no data" (HLM, LHM, and MMM). They have also extended this technique to the watermarking of video data. While their technique is robust and resilient to modifications, they cannot, however, encode large quantities of data, since they can only modify blocks where the data is already close to the data being encoded; otherwise, they must modify the coefficients to encode "no data". They must also severely modify the data since they must change large-scale ordering relationships of coefficients. As will later more fully be explained, these are disadvantages overcome by the present invention through its technique of encoding data by changing only a single bit in a coefficient.

As for Boland, Ruanaid, and Dautzenberg, they use a technique of generating the DCT Walsh Transform, or Wavelet Transform of an image, and then adding one to a selected coefficient to encode a "1" bit, or subtracting one from a selected coefficient to encode a "0" bit. This technique, although at first blush somewhat superficially similar in one aspect of one component of the present invention, has the very significant limitation, obviated by the present invention, that information can only be extracted by comparing the encoded image with the original image. This means that a watermarked and a non-watermarked copy of any media file must be sent simultaneously for the watermarking to work. This is a rather severe limitation, overcome in the present invention by the novel incorporating of the use of the least-significant bit encoding technique.

Such least-significant bit encoding broadly has, however, been earlier proposed; but not as implemented in the present invention. The Langelaar, Langendijk, and Biemond publication, for example, teaches a technique which encodes data in MPEG video streams by modifying the least significant bit of a variable-length code (VLC) representing DCT coefficients. Langelaar et al's encoding keeps the length of the file constant by allowing the replacement of only those VLC values which can be replaced by another value of the same length and which have a magnitude difference of one. The encoding simply traverses the file and modifies all suitable VLC values. Drawbacks of their techniques, however, are that suitable VLC values are relatively rare (167 per second in a 1.4 Mbit/sec video file, thus allowing only 167 bits to be encoded in 1.4 million bits of information).

In comparison, the technique of the present invention as applied for video, removes such limitation and can achieve much higher bit-rates while keeping file-length constant, by allowing a group or set of nearby coefficients to be modified together. This also allows for much higher quantities of information to be stored without perceptual impact because it allows for psycho-perceptual models to determine the choice of coefficients to be modified.

The improved techniques of the present invention, indeed, unlike the prior art, allow for the encoding of digital information into an audio, image, or video file at rates several orders of magnitude higher than those previously described in the literature (order of 300 bits per second and much higher, above 800 bits per second). As will later be disclosed, the present invention, indeed, has easily embedded a 10,000 bit/second data stream in a 128,000 bit/second audio file.

In the prior art, only relatively short sequences of data have been embedded into the media file, typically encoding simple copyright or ownership information. Our techniques allow for media files to contain entirely new classes of content, such as: entire computer programs, multimedia annotations, or lengthy supplemental communications. As described in said copending application, computer programs embedded in media files allow for expanded integrated transactional media of all kinds, including merchandising, interactive content, interactive and traditional advertising, polls, e-commerce solicitations such as CD or concert ticket purchases, and fully reactive content such as games and interactive music videos which react to the user's mouse motions and are synced to the beat of the music. This enables point of purchase sales integrated with the music on such software and hardware platforms as the television, portable devices like the Sony Walkman, the Nintendo Game Boy, and portable MP3 players such as the Rio and Nomad and the like. This invention even creates new business models. For example, instead of a record company trying to stop the copying of its songs, it might instead encourage the free and opened distribution of the music, so that the embedded advertising and e-commerce messages are spread to the largest possible audience and potential customers.

The present application, moreover, is specifically concerned with the high-bandwidth steganography feature described in our parent applications, as above discussed, for embedding (and recovering) data in a series of digital signals or measurements. These measurements, as earlier stated, may be taken directly from an analog data stream, such as an audio waveform, or they may be taken from subsampled and/or transformed digital data and the like. The key requirement of these techniques is that there be aliasing and/or quantization present in the conversion process, wherein the introduced aliasing and/or quantization is modulated or modified so as to embed substantial data without drastically affecting the quality of the digital signals or measurements.

Where, as also earlier mentioned, previous techniques, such as embedding data directly in the least-significant bit of a digital measurement, were capable of high bandwidth steganography, they did this at the cost of introducing large amounts of high-frequency noise into the data. Where the data is embedded at a rate of I data bit per N samples, they introduce noise into the data of the order of 1/N. With the techniques of said parent applications and herein, the amount of noise introduced into the data is greatly reduced for the same amount of data embedded; in particular, reduction of introduced noise to from an order of 1/N (with the previous least-significant bit techniques) to an order of $1/N^2$, for typical data distributions. This means that much higher density of data can be introduced without perceptible change, than was possible by using previous techniques.

Examples of applications where the invention is particularly advantageous for embedding data in signals or measurements, include:

Audio waveform measurements (such as the PCM algorithm used in CDs, or compressed audio files such as in the earlier discussed MP3);

Image value measurements (such as a scanned image, a fax, or a compressed image file such as jpeg);

Time-varying image value measurements (such as a digitized movie, or compressed video files such as mpeg); and Any other type of data consisting of a series of physical measurements (temperature or pressure readings, machine control data, process monitoring, etc.)

The ability afforded by this invention to add a high-bandwidth digital channel inside an existing media format, without changing the media format, is, indeed, of widespread utility and applicability. For example, we have used it in such applications as adding advertising, interactive content, games, and software downloads to existing media content, as described in our said parent patent applications.

OBJECTS OF INVENTION

It is accordingly a primary object of the present invention to provide new and improved high-bandwidth steganographic techniques as disclosed in our said parent applications, for embedding supplemental data in the series of digital signals or measurements taken, for example, directly from an analog data stream such as an audio waveform and the like, or from subsampled and/or transformed digital data and the like, wherein the input data is quantized and/or aliased and the supplemental data bits are successively embedded therein, preferably by novel least-significant-bit parity encoding techniques, for attaining the above-described advantages afforded by these novel techniques.

Other and further objects will be explained hereinafter and are more particularly delineated in the appended claims.

SUMMARY

In summary however, from one of its broader or generic aspects, the invention embraces the method of steganographically embedding substantial supplemental digital data in a series of digital measurements derived from one of an analog data stream and subsampled and/or transformed digital data, that comprises, deriving such series of digital measurements through functional transformation from a set of input data converted into a set of output data of successive quantized and/or aliased components, transforming the supplemental digital data into a series of successive bits; and introducing the successive bits into the quantized and/or aliased components to modulate successive components through but slight adjustments of the same, thereby to embed the supplemental data in the series of digital measurements without substantially affecting the quality thereof Best mode and preferred embodiments, techniques and designs for implementing the invention are hereinafter explained in detail.

DRAWINGS

The invention will now be described in connection with the accompanying drawings, FIG. 1–10 of which are identical with those presented in our said parent application Ser. No. 09/389 941 and illustrate the following;

Figure 2:
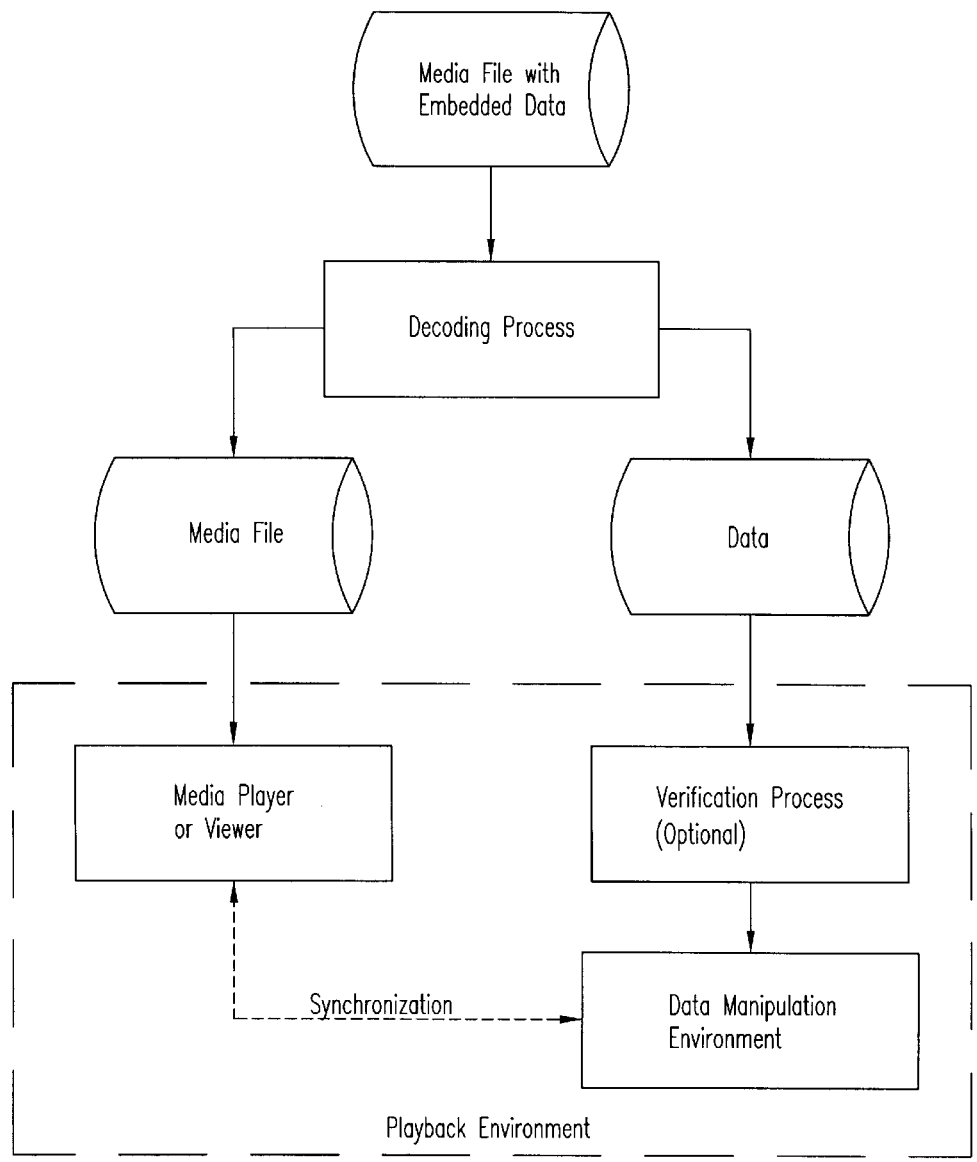
FIG. 2 is a similar diagram presenting an overview of the decoding of the media file embedded with the data of FIG. 1 as playback by the media player or viewer.
Figure 3:
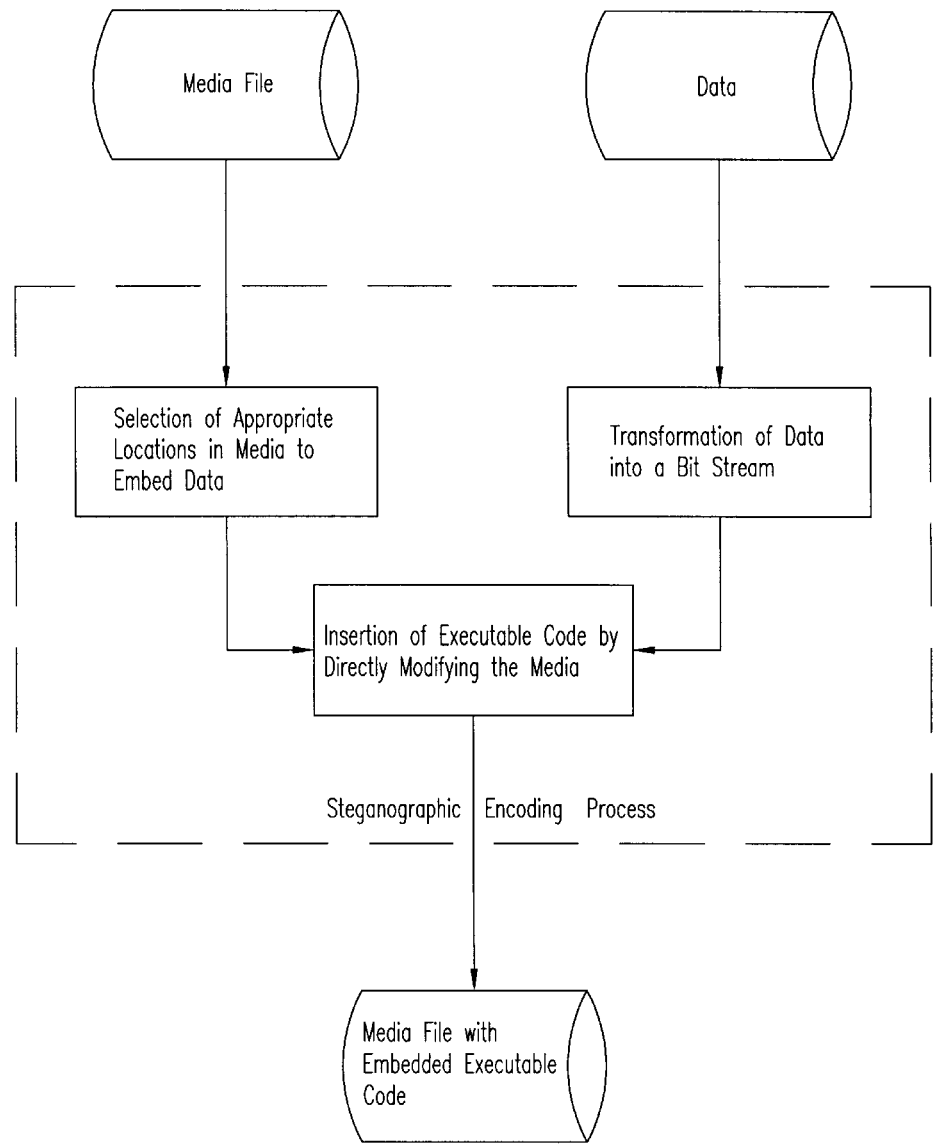
FIG. 3 is a view similar to FIG. 1 showing the use of the previously (and later) discussed steganographic techniques in the encoding process.
Figure 4:
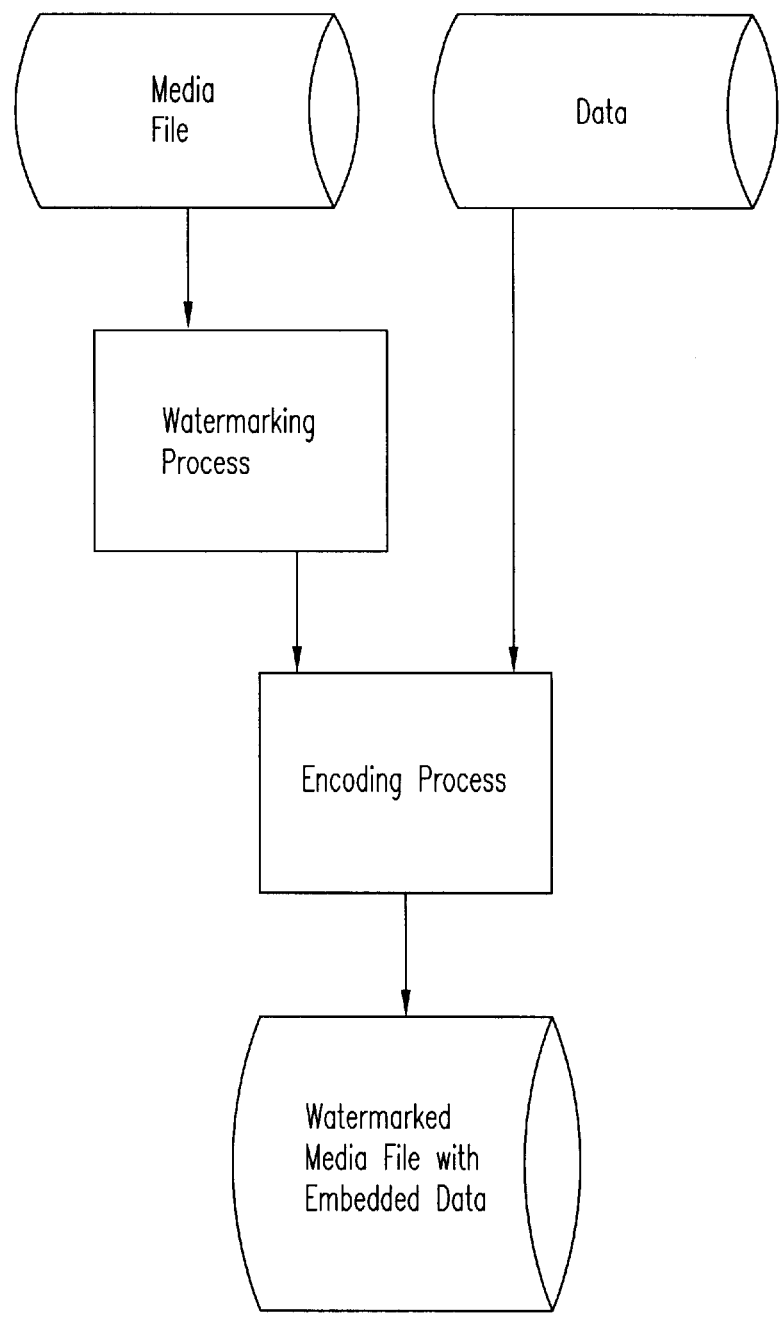
FIG. 4 illustrates the use of the before-mentioned digital watermarking processes with the encoding process of the invention.
Figure 12:
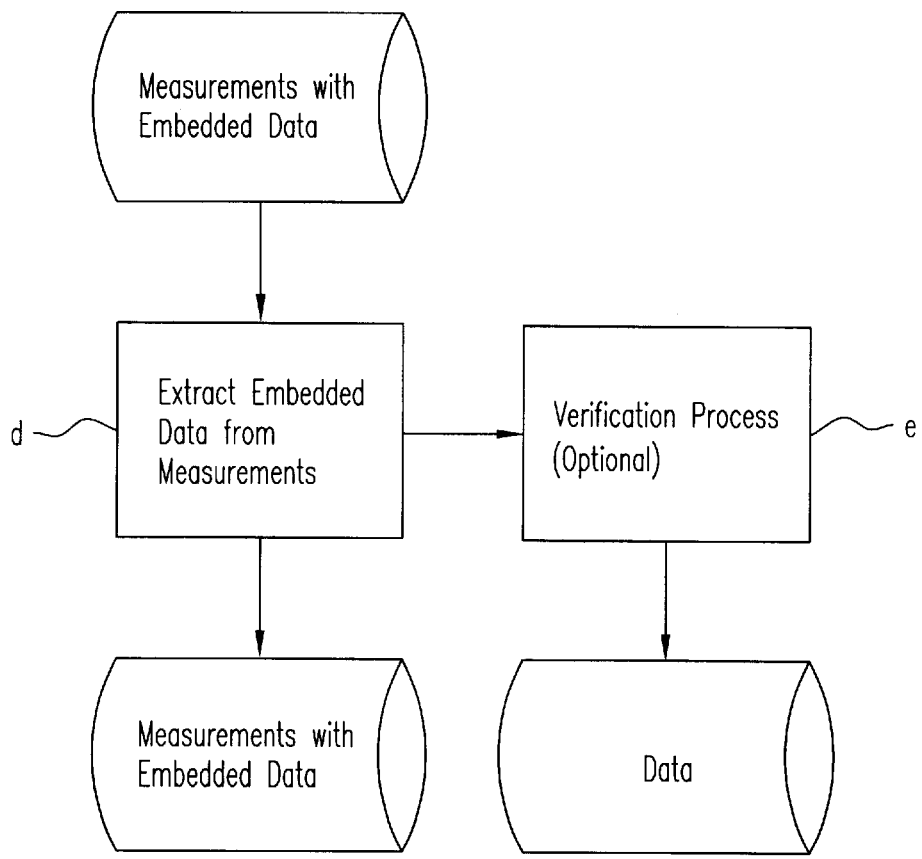
Figure 13:
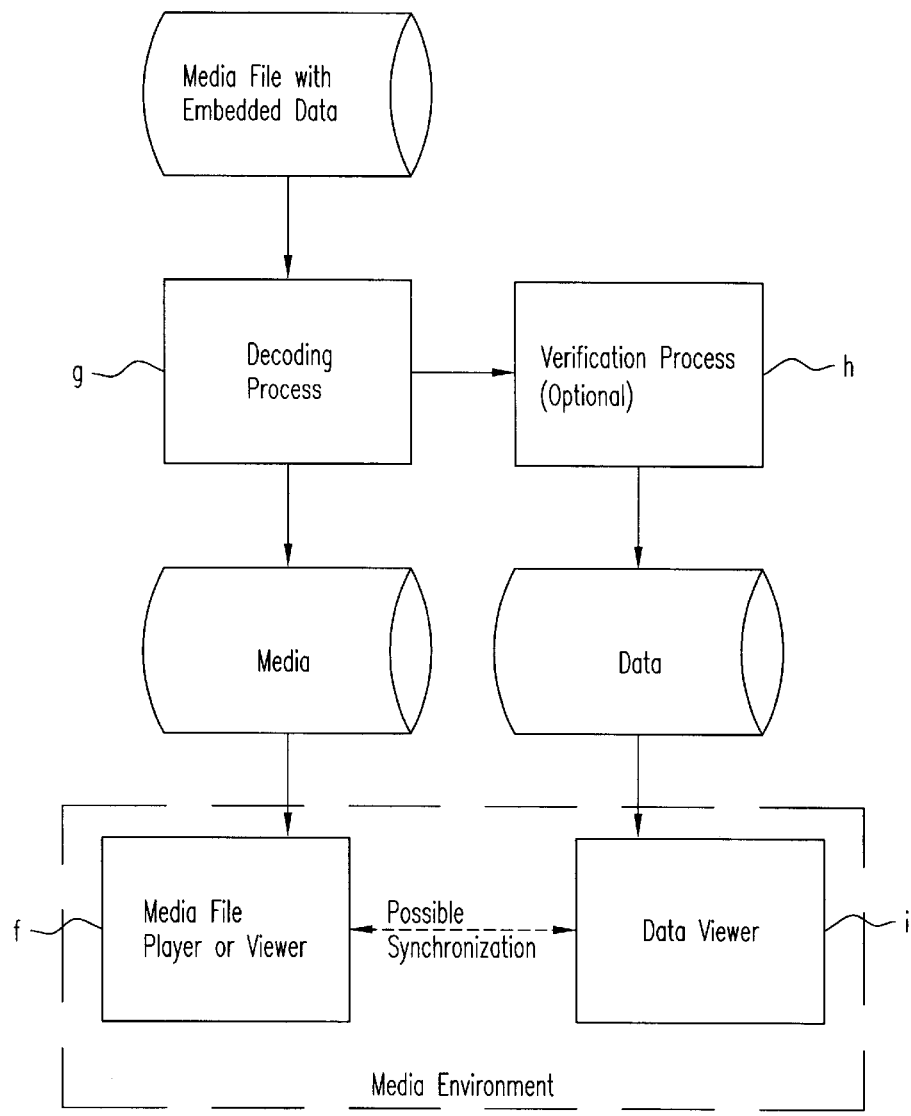
Figure 14:
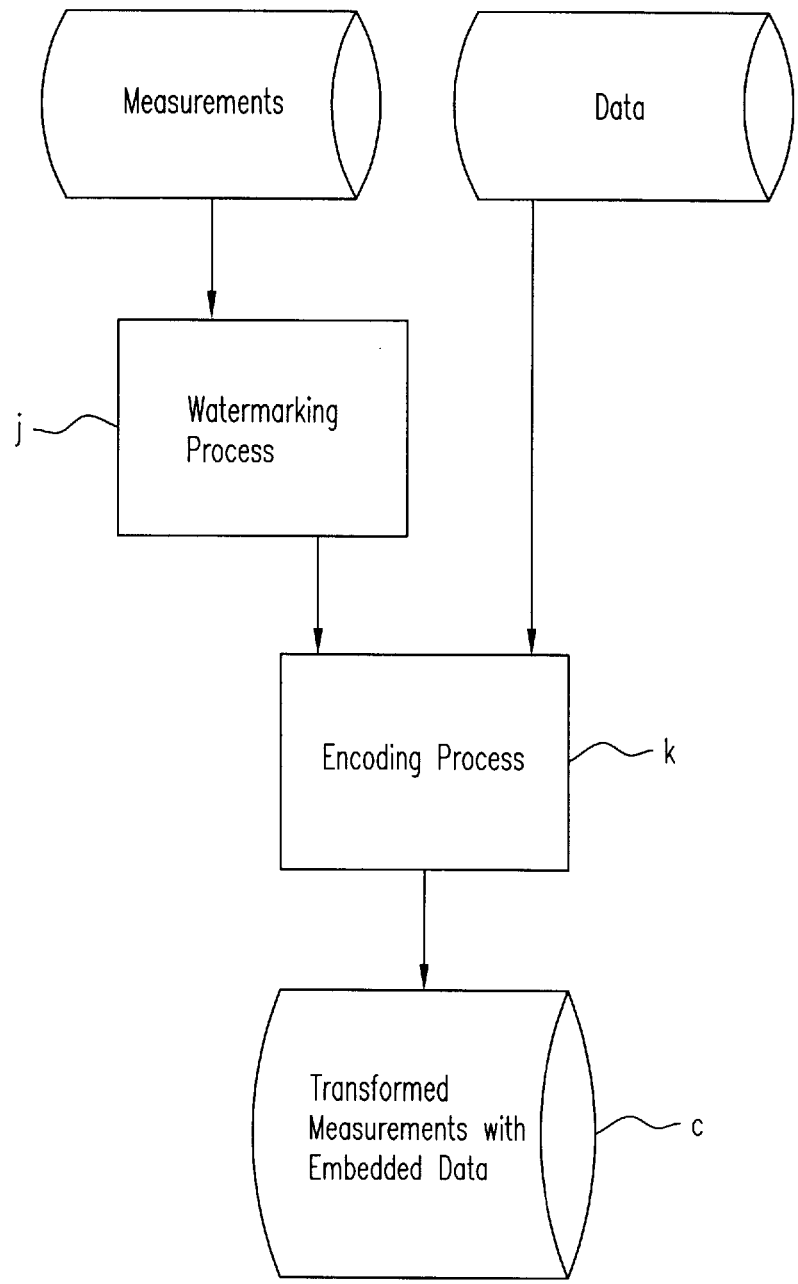
Figure 15:
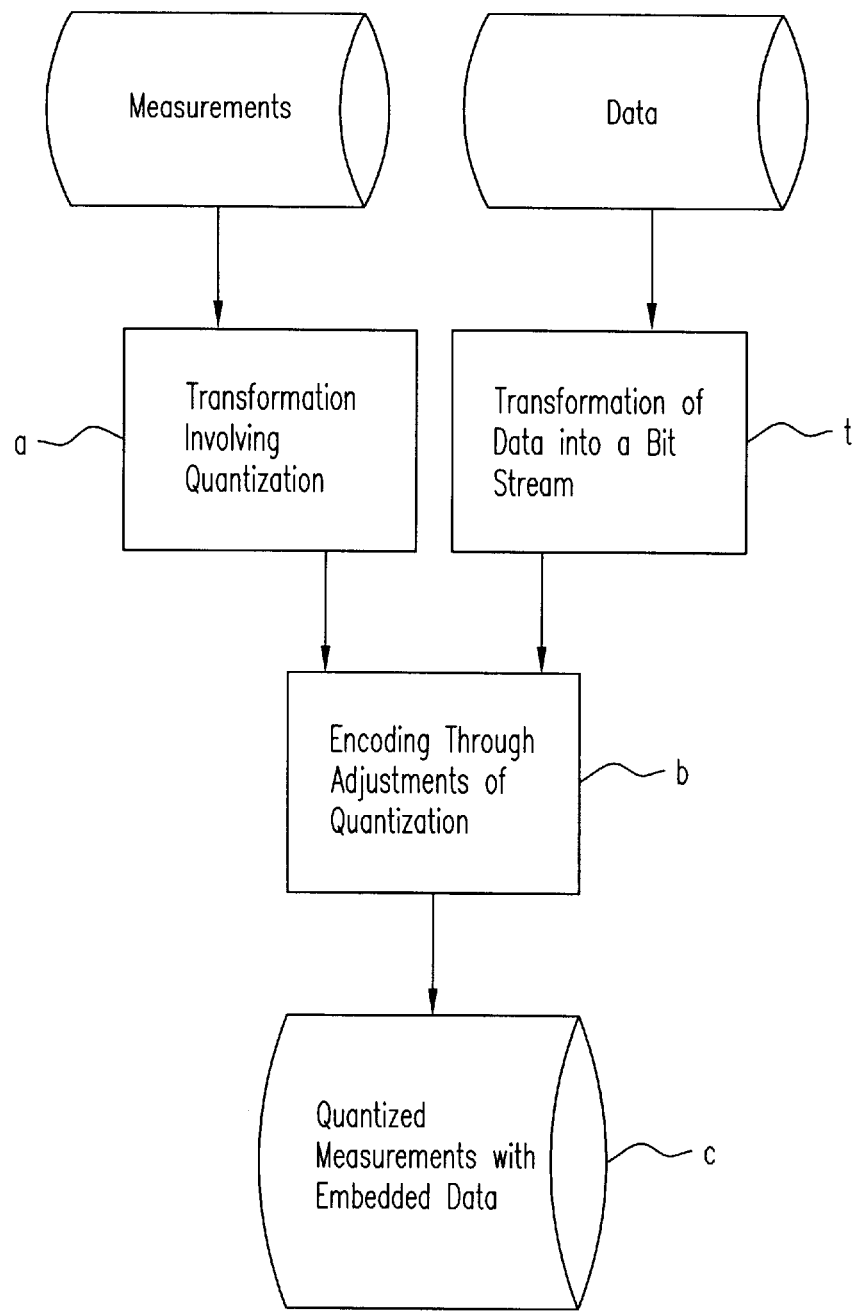
Figure 16:
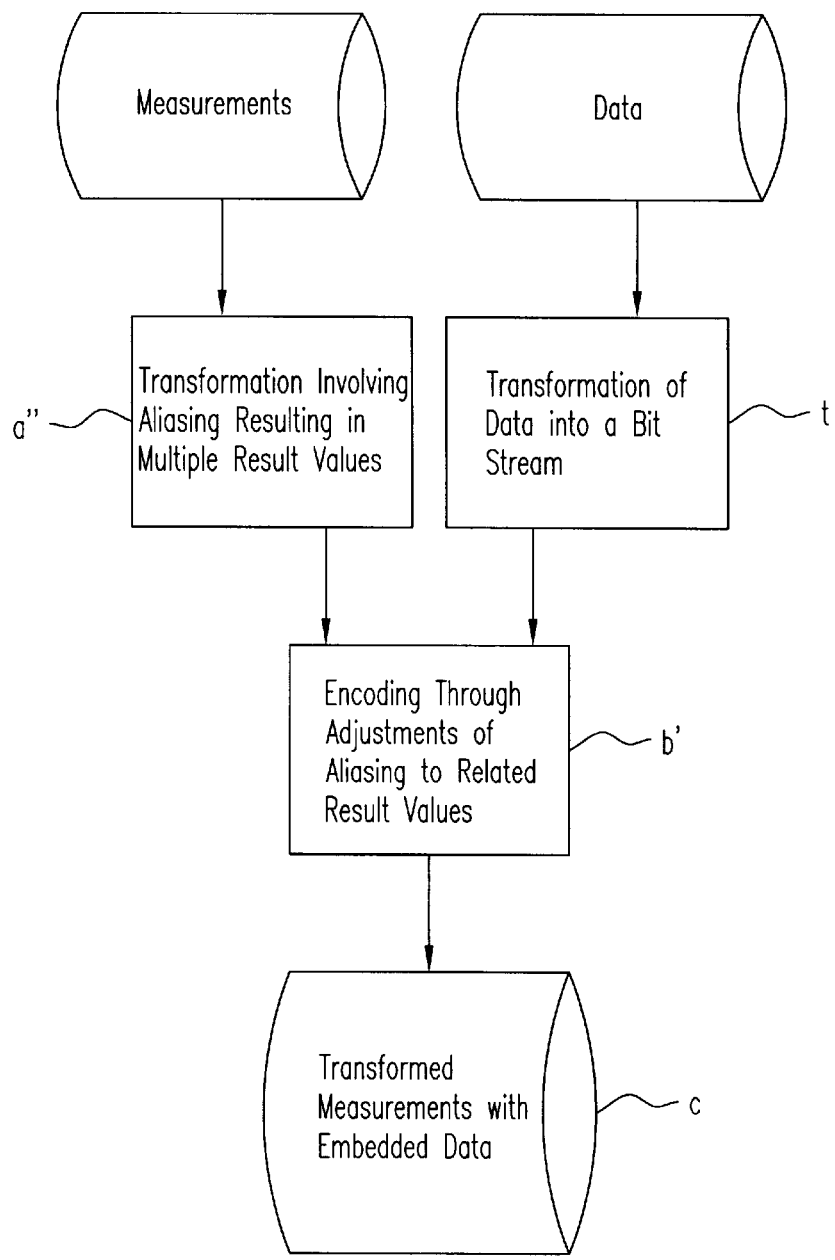

FIGS. 12 and 13 similarly more generically illustrate the system of FIG. 2 for "Data Extraction", rather than "Data Encoding Playback";

FIG. 14 is identical to FIG. 4 showing the use of watermarking with the encoding technique invention, but again using more generic labeling of "measurements" rather than "media file";

FIGS. 15 and 16 track FIG. 3 (and FIGS. 6–8) using the more generic labels "measurements" and "quantization" and "aliasing" of the "transformation", respectively, in the data encoding process, and the generic title term "modulation" for "modifying" in FIG. 3

Figure 17:
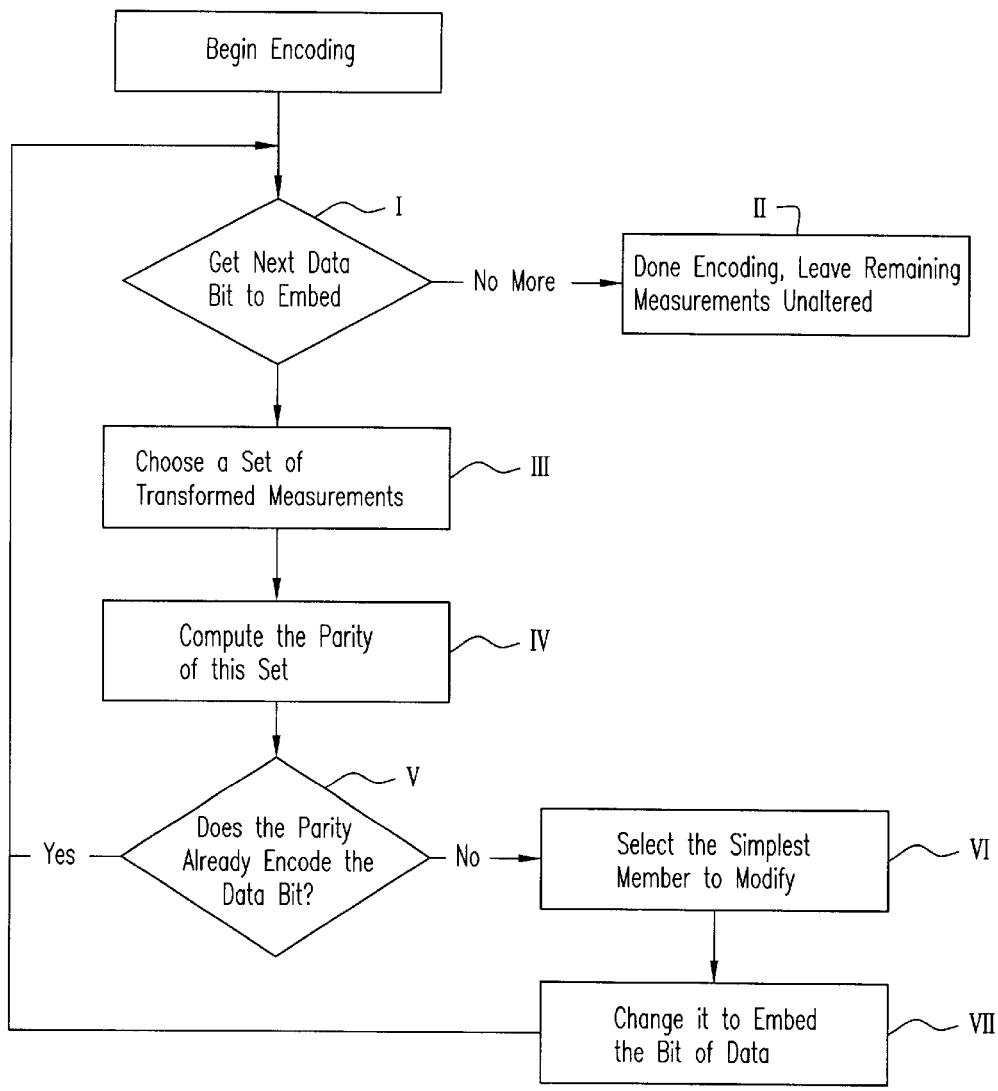
Figure 18:
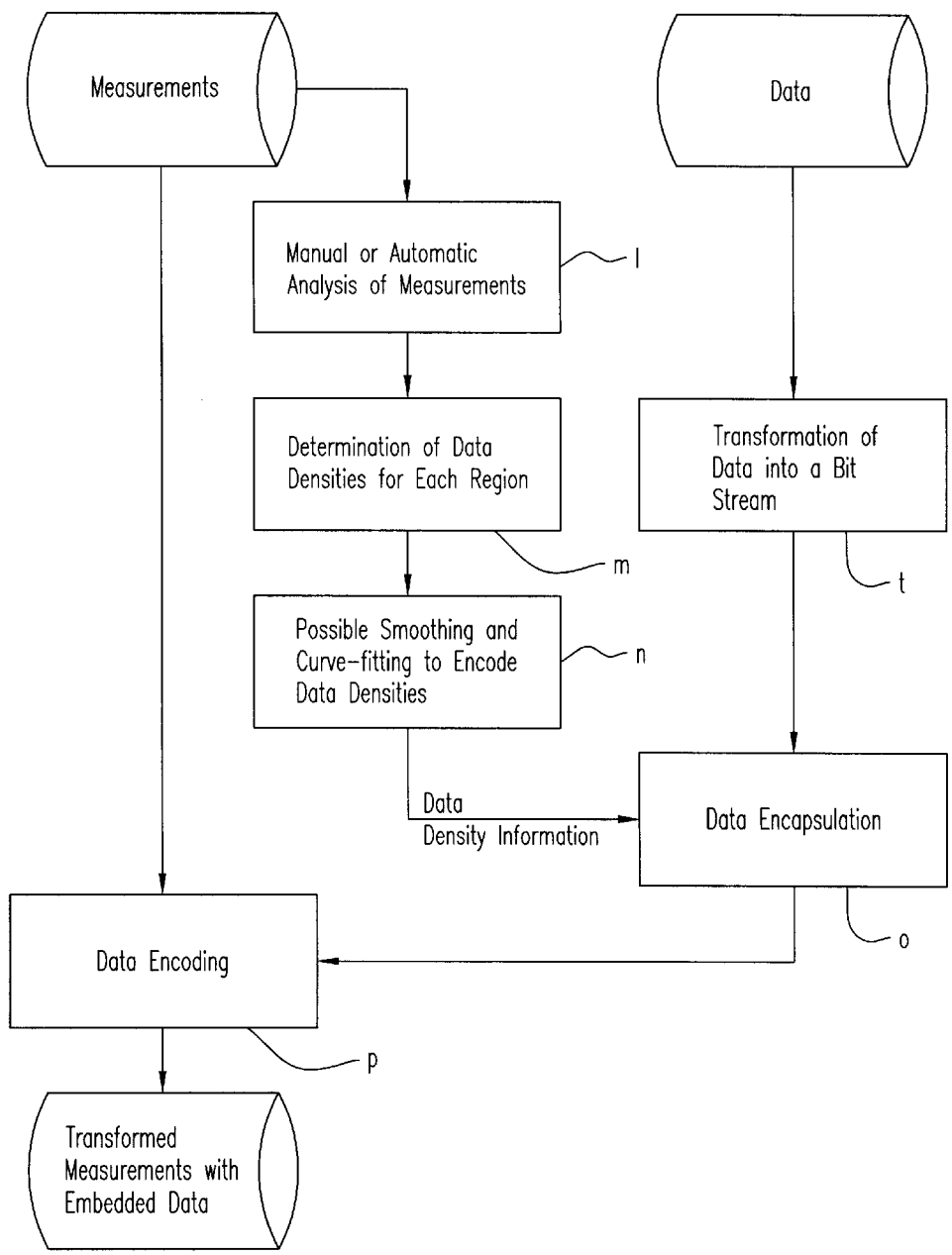
Figure 19:
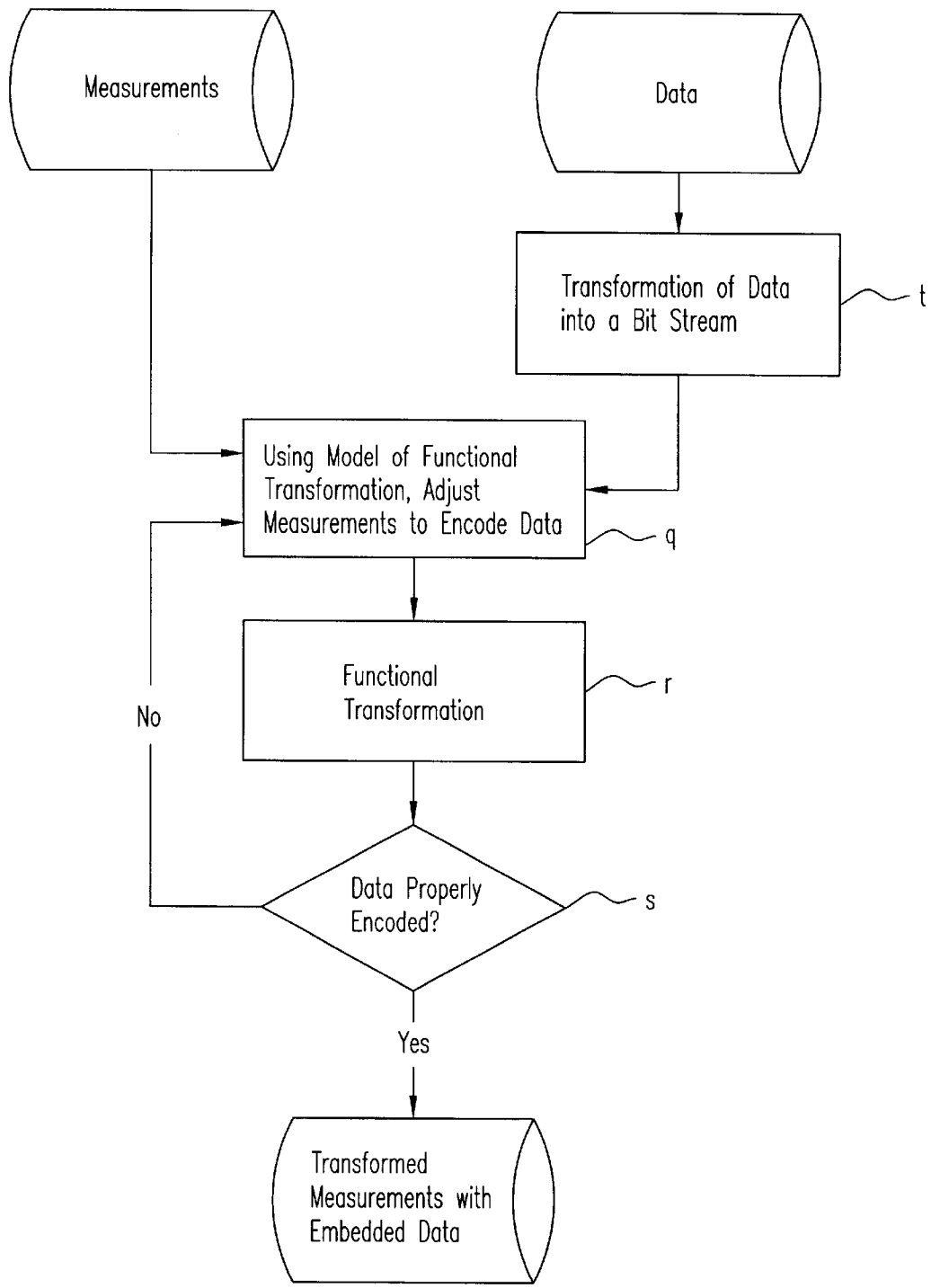
Figure 20:
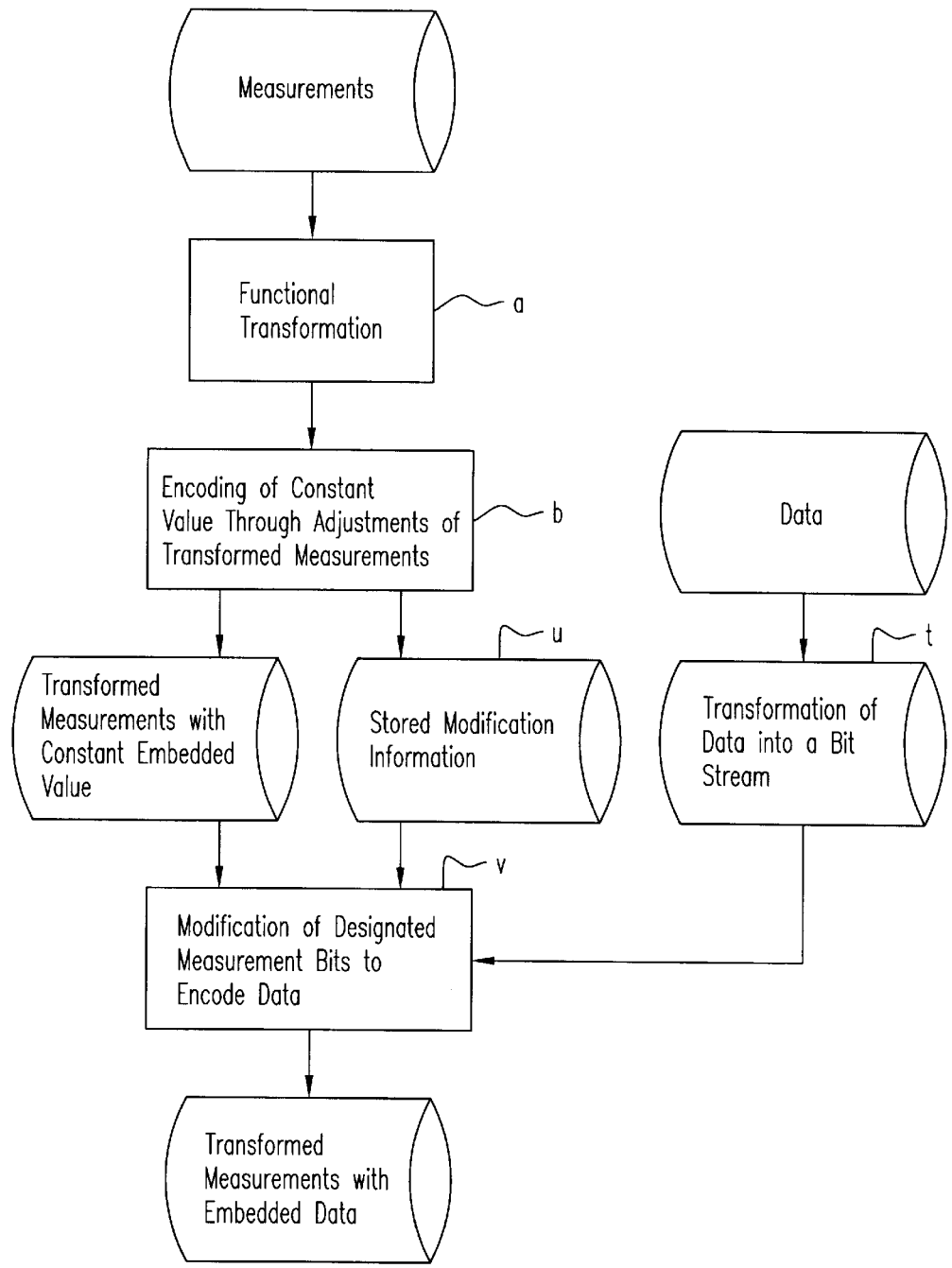
Figure 21:
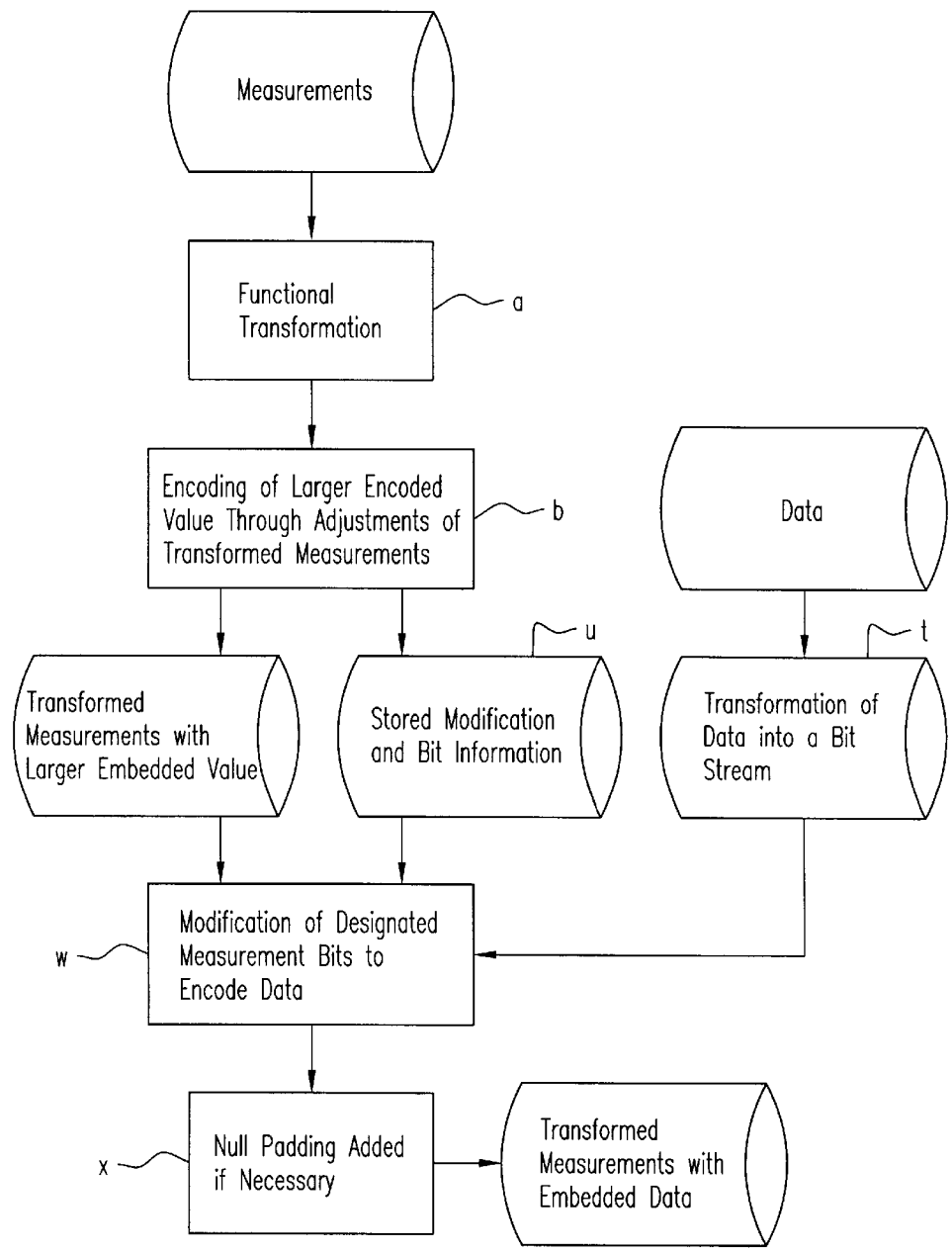
Figure 22:
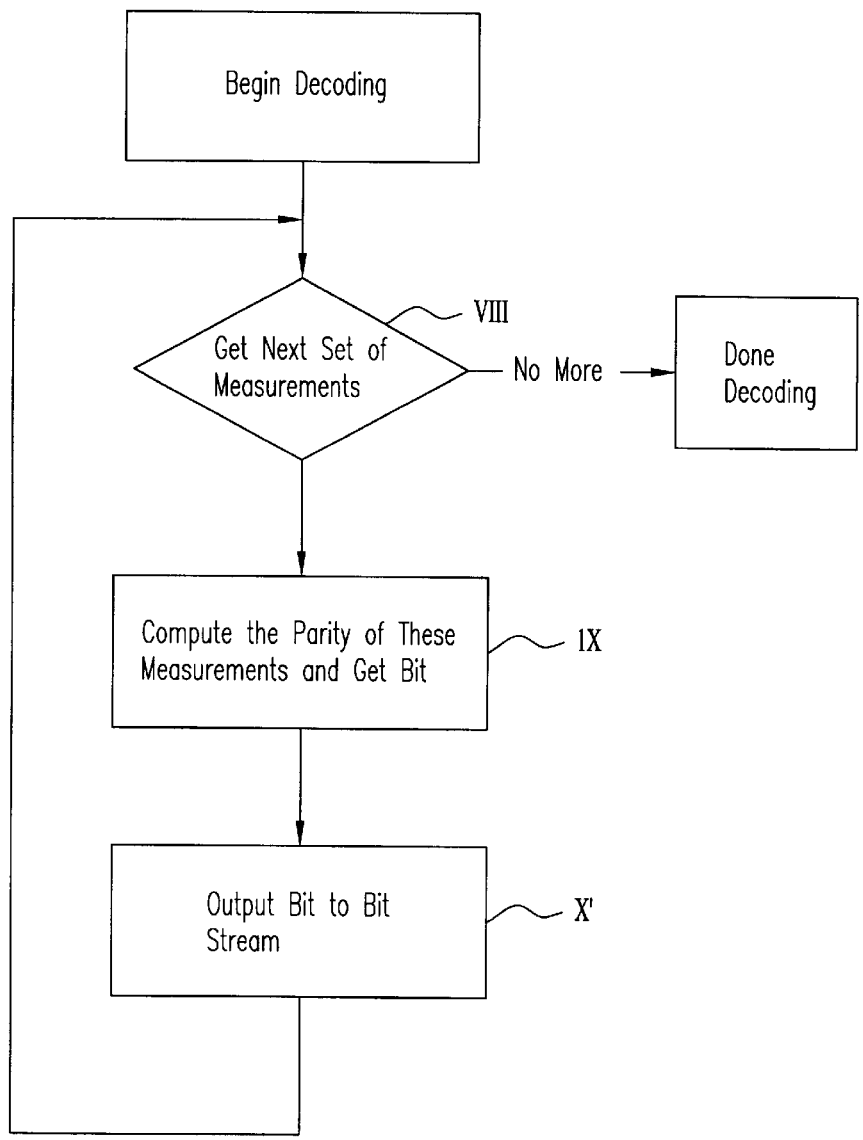

FIG. 17 is a flow diagram of the parity encoding discussed in said parent application and further detailed herein;

FIG. 18 illustrates the use of variable rate data encoding in accordance with the principles of the invention;

FIG. 19 is a system and operational diagram of a black box encoding modification;

FIGS. 20 and 21 illustrate the of the to the techniques of the invention applied to pre-computation for dynamic embedding; and FIG. 22 illustrates the parity decoding.

DESCRIPTION OF PREFERRED EMBODIMENTS OF THE INVENTION

As before discussed and as described particularly in said parent application Ser. No. 09/359,941, an important application of the process and system of the invention is for the adding of supplementary relatively large quantities of data to pre-prepared media files that have been compressed by frequency-domain transformation, providing a set of coefficients which approximate or represent the source media. Such large quantities of supplemental digital data are embedded into the files seamlessly and facilely. This is done, moreover, in such a manner as to enable such supplemental data to be extracted by digital media playback apparatus, while preserving backwards compatibility with existing media players.

Suitable compressed media formats are those which compress a media file by transforming it from the signal domain into a set of function coefficients; for example, the Fourier, Sine, Cosine or Wavelet transformations and their variations. In such compressed media formats, the set of coefficients, as before stated, approximate the source media though having a smaller representation than the original data file.

Examples of suitable compressed media formats with which the invention may operate include, but are not limited to, the MP3, MP2, MPEG, and JPEG formats described in the before-cited references. The compressed media may also have additional embedded data such as digital watermarks.

Data that may be embedded into the compressed media include, but are not limited to text files, database files, executable program code (such as Java files, Macromedia Director, Shockwave or Flash, Perl, VRML, TCL, Visual Basic, machine code, or byte codes), image files, audio files, 3-D files, or any archive format such as cab, jar, car, or zip or the like.

Types of playback apparatus for presenting both the original pre-prepared media file content and the supplemental embedded data content include any computer system capable of playing or viewing a media file. Specific examples of players include, but are not limited to, portable music players, Personal Digital Assistants (PDAs), WebTV, digital televisions, car stereos, home audio systems, video walls, and console and portable game devices and the like.

Underlying the implementation of the invention generally, as more fully explained hereinafter in connection with the various systems and applications illustrated in the drawings, are novel techniques for encoding the bits of the digital data signal by means of small modifications to the coefficients. Because the pre-prepared data files are stored and transmitted in digital form, the small modifications remain intact. When used to encode high bit-rate information, however, these techniques may not always be robust to modifications of the data file, and the data may be corrupted. Robustness may be improved by repetition of the data and by careful choice of the coefficients to be modified; but in many of the intended applications of the techniques of the invention, robustness is a lower priority than the encoding of maximal information without excessive degradation of the user's playback experience of the compressed media.

The Systems of FIGS. 1–10

Figure 1:
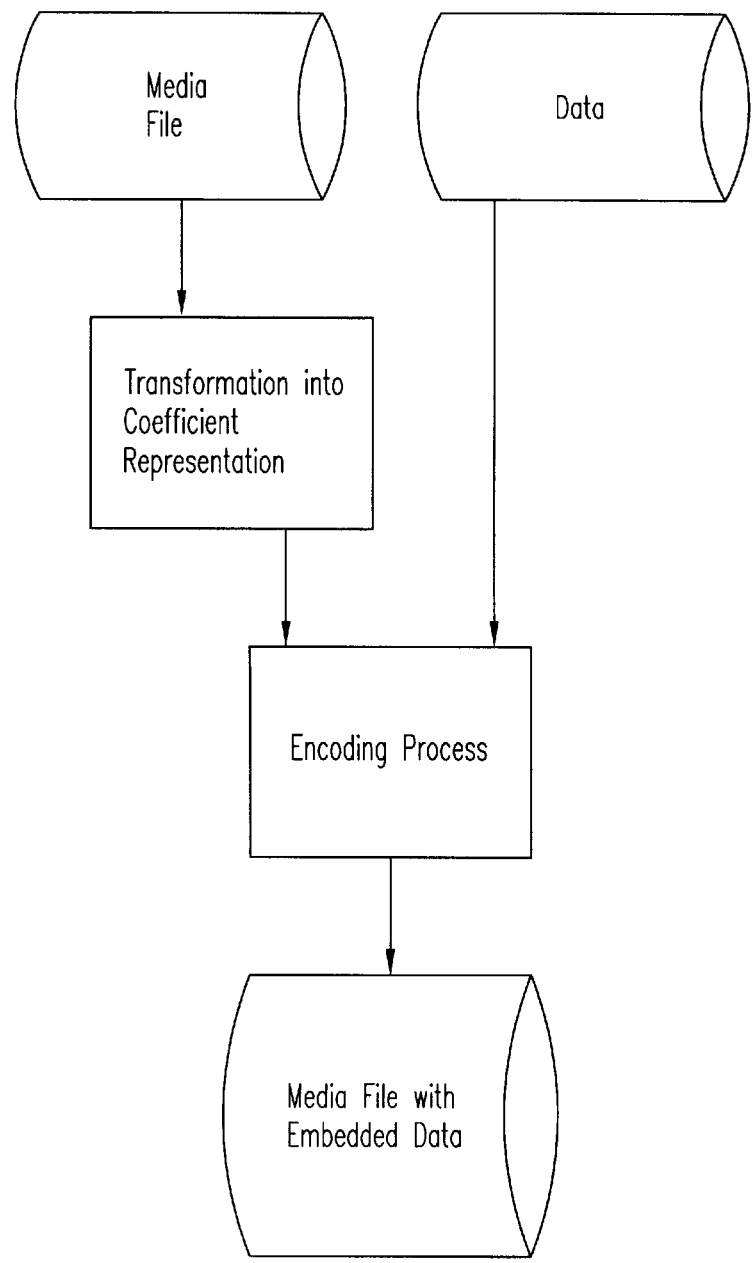
FIG. 1 is a block and flow diagram illustrating an overview of the data encoding process and system, operating in accordance with a preferred embodiment of the invention.
Figure 5:
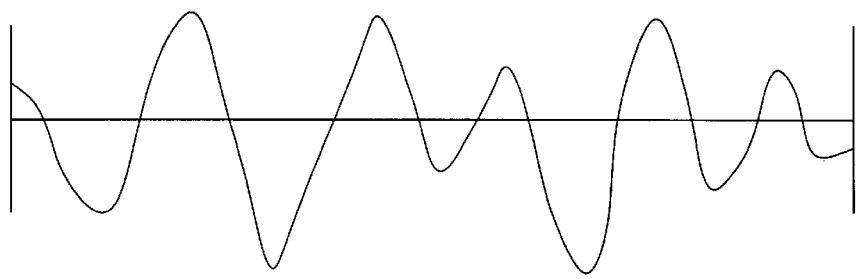
FIG. 5 is an exemplary signal waveform and Fourier transformation-based compressed coefficient-based representation of the signal for use in the coefficient-domain parity encoding process useful with the invention.

Referring now to FIG. 1, a media file such as for example, the previously discussed audio, image, video, 3-D or other multimedia data or the like, is shown encoded by frequency transformation, so-labeled, in a coefficient representation, of the media data using a Fourier, Cosine, Sine, Wavelet or related discrete transform representation as earlier described, and as illustratively shown in the signal waveform and coefficient-based tabular illustration of FIG. 5. The transformation into coefficient representation results in a compressed media file content format. If the pre-prepared media file has earlier been encoded into a coefficient representation, this further transformation step will, of course, not be required. A further compressor step may, however, also be used.

The thusly compressed media file content is diagrammatically shown combined in an encoding process of any well-known type, later more fully discussed, with the supplemental data content ("Data") for embedding into the media file, such additional data being any digital data, as earlier stated, including, but not limited to, audio, video, image, database, text, executable code, or application-specific data and the like. There then results, a media file with supplemental embedded data without affecting its backwards compatibility with existing file formats, and without substantially affecting the user's playback experience of the media file. If desired, moreover, the transformation step of FIG. 1 may be made part of the encoding process, and may even include an optional compression step; or these may be applied as additional separate steps. In the event that such transformation, compression and encoding processes are combined, indeed, it is then possible to use perceptual encoding techniques to choose into which coefficients to embed the data.

Continuing with broad overview, the decoding and playback are diagrammed in FIG. 2, wherein the decoding process, so-labeled and later more fully discussed, is dependent upon the type of encoding process used in FIG. 1 to embed the supplemental data into the media file. Typically, such involves a simple reversal of the encoding process, as is well-known. The media file, as shown, is usually left unchanged in the decoding process because not only is it often not feasible to remove the data, but to do so would not typically improve the user's playback experience at the media player or viewer, shown in FIG. 2 in the playback environment. The supplemental data, however, may be verified ("Verification Process") by well-known checksum or digital signature to insure that the data is bit-wise identical to the data which was originally encoded and embedded in FIG. 1.

In the playback environment, moreover, the media player and the execution environment may communicate with one another, illustrated schematically in FIG. 2 by the SYNC line between the player and the data manipulation environment boxes, so that the execution of the supplemental data can be synchronized with the playback of the media file content.

The possible use of data encoding using steganographic techniques was earlier mentioned with reference citations, and such an application to the techniques of the present invention is illustrated in FIG. 3. The supplemental data to be embedded is there shown transformed into a bit stream code, with the bytes of the data extracted into a bit-by-bit representation so that they can be inserted as small changes into the media file. The selection of the appropriate locations in the media file content into which to embed the data bits, as labelled, is based on the identification of minor changes that can be made to the actual media content with minimal effects to the user's playback experience of the file. Such changes, however, must be such that they can easily be detected by an automated decoding process, and the information recovered.

At the step of "Insertion of Executable Code" in FIG. 3, any one of a number of steganographic encoding processes (including those of the earlier cited references) may be used. In accordance with the present invention, where the media content is represented as a set of function coefficients, the data bits are preferably embedded by the technique of modifying the least-significant bit of some selected coefficients, as hereinafter also more fully discussed.

The resulting media file with embedded executable code is again backwards compatible, with, in some cases, slightly diminished, but entirely acceptable, possible user playback experience due to the embedding process.

Where the use of digital watermarking with the encoding techniques of the invention is desired, the system of FIG. 4 may be employed, with the media file watermarking process effected prior to the data embedding by the encoding process, as labelled. There are many different types of digital watermarking processes that can be employed, including those of the earlier cited references. Most watermarks are robust and are thus not easily removed by modifications of the media file, and so are not affected by the later "Encoding Process" to embed the data as shown in FIG. 4. The data embedding is done after the watermarking, however, since some data embedding techniques are not robust to to modifications of the media file. A watermark media file with embedded data thus results wherein the file has a robust watermark and contains the supplemental data embedded therein.

Traditional watermarking techniques are only capable of embedding data at relatively low bit rates; for example, about 22 binary digits (bits) of data per second of audio. In accordance with this invention, more than 10,000 bits of data per second have been readily embedded in an MP3 audio file encoded at a bit-rate of 128,000 bits/sec.

We have, indeed, performed successful preliminary tests of several of these various encoding techniques of the invention. Using an exemplary audio file taken from the song "Jealousy" by Natalie Merchant, we encoded as an (MPEG) MP3 at 128 kbits/sec, using Fraunhofer's MP3enc encoder. The encoded portion of the file is 30 seconds long, and is 720 kilobytes in size. The primary encoding technique chosen was the Phase/Magnitude Frequency-Domain Low-Bit Coding Technique, while varying the interval at which data was encoded in the file.

The successful results are as shown below:

| Files | Embedding Interval | Data Rate Achieved | Affected Sound Quality |
|---|---|---|---|
| Original CD | none | none | original |
| MP3 | none | none | slight compression artifacts |
| MP3 w/Data | 1 bit/16 coefficients | 2800 kbits/sec | close to original |
| | 1 bit/8 coefficients | 5600 kbits/sec | MP3 |
| | 1 bit/4 coefficients | 11200 kbits/sec | some artifacts |

The above 2800 kbits/sec data rate embeds numerically about 2.2 percent of the earlier-mentioned 128,000 bit/sec media file content; the 5600 kbits/sec, about 4.4 percent; and the 11,200 kbits/sec, about 9 percent, representing from about a few percent to a substantial percentage of the media content. As shown in the embedding interval column and later described with 32 coefficient measurements, this invention enables coefficient measurement modification over a range of from a few percent (3% of the 32 coefficients) to a substantial fraction or percentage of the coefficients (25% for the 1 bit/four coefficients).

Figure 6:
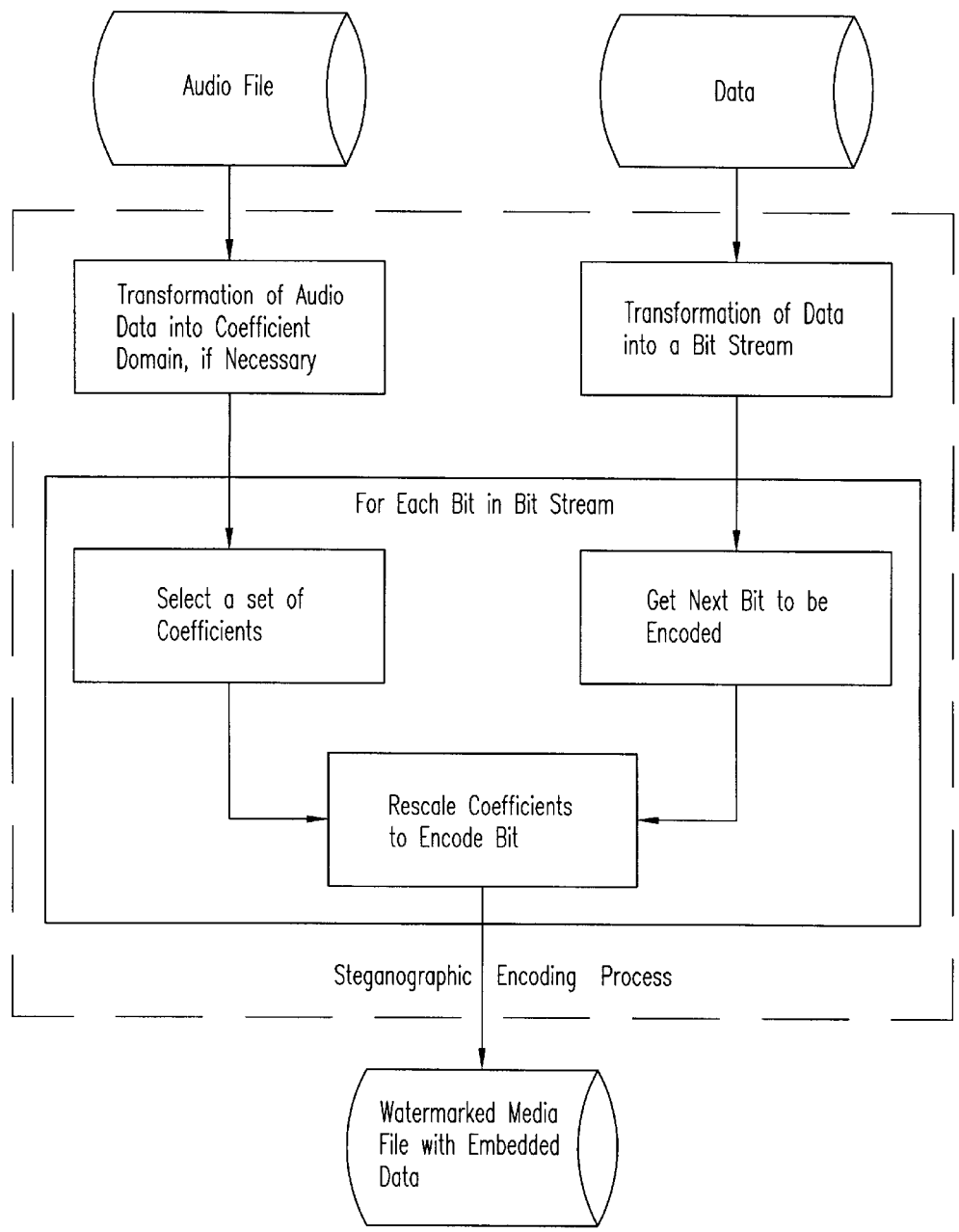
FIG. 6 is a more detailed block and flow diagram specifically directed to a steganographic encoding of audio data, compressed through transformation into a coefficient domain and embedded with data and digitally watermarked in accordance with the process of the invention.

Further in connection with audio media file applications, reference is now made to the audio file data and coding system of FIG. 6.

As in the general scheme of FIG. 1, the pre-prepared audio file of FIG. 6 is shown compressed by the before-discussed transformation into a coefficient domain, providing that it has not already been encoded in the coefficient domain. This step is, however, unnecessary if the audio file is already in such a format, such as with the MPEG audio content in the test above-reported, which is encoded in the DCT domain. As in the steganographic technique system of FIG. 3, earlier described, the supplemental data to be embedded in the audio file is shown transformed into a bit stream.

It is now in order to select the sets of suitable coefficients of the audio file transform, preferably at regular intervals, for implementing the data bit embedding in accordance with the present invention. As earlier pointed out, the invention need change only a single bit in a selected coefficient, as distinguished from prior art large—scale ordering changes in the relationships of the coefficients (for example, as in the previously cited Zhao and Koch references). This set can be selected by simply choosing a consecutive series of coefficients in the audio file. A preferred technique is to choose a set of coefficients which encoded a wide range of frequencies in the audio data (FIG. 5).

For each bit in the data bit stream, FIG. 6, the selected coefficient and the next data bit to be encoded are combined, re-scaling the coefficients to encode the bit ("Rescale"). If possible, this is preferably done in conjunction with the quantizing and re-scaling step so that the choice of the coefficient to be modified can be based on the closeness of the original coefficient to the desired value. After much quantizing and re-scaling, furthermore, there is not as much data on which to base this decision.

The re-scaling, moreover, can be done in-place in an already-encoded audio file, with the added constraint of keeping the file size constant. In such a case, where it is not possible to encode the bit just by re-scaling a single coefficient while maintaining the frame rate, multiple coefficients may be changed so that their compressed representation remains of the same length and the audio file is accordingly minimally disturbed.

This encoding may be accomplished through an LSB encoding process, or preferably through the LSB parity encoding (FIG. 5). Such parity encoding allows more choice regarding the coefficients to be modified.

Referring to the illustrative coefficient-based representation of the table in FIG. 5, the parity of the coefficient can be computed by adding them together:

12+15+5+3+10+6+12+1=64.

Since 64 is even, the bit value currently encoded in these co-efficients is 0. If, however, it is desired to encode a 1 in this set of coefficients, it is only necessary to make the parity odd. This can be done by choosing any amplitude or phase value, and either adding or subtracting 1. This choice of value can be done arbitrarily, or can be made based on the types of psycho-acoustic models currently used in the before-discussed MPEG encoding process.

This illustrates the use of parity of the low bits of a series of coefficients in the encoding of the data by magnitude frequency-domain low-bit coding. As an example, assume it is desired to encode a single bit of data information in a series of, say, eight coefficients. In accordance with the invention, instead of simply modifying the low bit of the first coefficient, encoding is affected by modifying the parity of the eight low bits together. The algorithm examines a set of consecutive coefficients, extracts the low bits, and counts how many of them are set. Thus, with the technique of the invention, a single bit of data can be encoded whether the number of set bits is even or odd (the parity). This provides the advantage of providing algorithmic choice in determining which coefficient to modify, if any.

Alternatively, this technique may be applied to a wider range of values, while using higher-order parity. As an example, the same amount of data can be encoded over 32 coefficients as can be encoded over two 8-coefficient regions, by adding up the low bits of those 32 coefficients and then computing the result modulo four (the remainder when dividing by four). This provides more flexibility in choosing which coefficients to modify, though it does not allow as much data to be inserted into the stream.

While having earlier stated in connection with, for example, the overview embodiment of FIG. 1, that well-known types of encoding processes, including those of references cited herein, may be used in the implementation of the invention, a preferred encoding process for MPEG layer III audio files (MP3) above-discussed will now be detailed for such an MPEG audio stream. In the following description, the notation $xx is used to refer to a hexadecimal-encoded octet; e.g., $00 represents the binary digits 00000000. This frame are the ISO-8859-1 (ASCII) characters "EXEC". This is followed by a four-octet Size header and a two-octet Flags header, as described in the ID3v2 specification. This is followed by $00, to represent the use of ISO-8859-1 text encoding within the frame, or by $01, to represent the use of ISO/IEC 10646-1 (Unicode) text encoding, later referenced. A header is first created containing a description of the executable code and how it was embedded. The first octet is an unsigned number representing the number of coefficients which are grouped together to represent a bit. This will most often be 8. This is followed by an eight-octet unsigned number representing the length of the header plus the executable code. Next is the ISO 8859-1 (ASCII) encoded MIME type of the executable content as described in IETF RFC 2045, also later referenced, followed by $00. For example, the MIME type of the before-mentioned Macromedia Flash files is "application/x-shockwave-flash". This is followed by a description of the executable code in ISO-8859-1 (ASCII), terminated by $00. This, in turn, is followed by a single octet, which is $00 if there is no checksum, or $01 if there is a checksum, as described in connection with FIG. 2. If there is a checksum, this is followed by a single octet of the checksum, created by summing the octets of the executable code together, and taking the result modulo 256. This is useful because this lets the executable code be examined before executing, to reduce the possibility that there have been transmission errors that might cause erroneous instructions to be executed.

This header is placed in the beginning of the executable content. The entire package, of the header plus the content, is then transformed into a bit-stream by examining each octet in turn, and placing its bits into the bit high stream from Most Significant-Bit to Least-Significant-Bit ordering. Now that the bit-stream has been generated, it is necessary to embed it into the MPEG audio file. To do this, any of the techniques described herein may be used. One preferred technique is to use the previously described LSB parity encoding. Here, one may modify the parity of groups of eight coefficients, though any number may be used. This group of the coefficients is chosen by selecting every seventh coefficient in the data file. In this way, a total of 7 bits may be encoded in a set of 56 coefficients, where each group of coefficients contains coefficients that represent a wide range of frequencies. The previously described parity encoding technique may be used to encode a bit in each set of coefficients, until the data is completely embedded. Where the data is too large to fit in the file, one may use the parity of fewer than eight coefficients to represent a bit, though this may reduce the quality of the listening experience. When a number of coefficients other than eight are used, the first byte of the data file is encoded using eight coefficients, and then all succeeding bytes are encoded using the number of coefficients specified in the first byte.

In the preferred embodiment of the invention, as earlier stated in connection with FIG. 2, the decoding process is a simple reversal of the encoding process above-detailed. The first octet is extracted from the audio data, and based on that, all succeeding bits are extracted as well. If there is a checksum encoded in the header, the octets of the executable code are summed, the result taken modulo 256, and compared with the encoded checksum. If they are equal, then execution proceeds.

Based on the MIME type of the executable code, an appropriate execution environment is instantiated. In the case of the application/x-shockwave-flash type discussed previously, a reference execution environment is described by Macromedia in the Flash Standards web page located at http://www.macromedia.com/sofware/flash/open/.

The execution environment is then invoked to begin execution of the executable code simultaneously with the playback of the audio file. Additional Application Programming Interfaces (APIs) may be defined with reference to the execution environment to control the exact behavior of the execution environment relative to the audio file while playback is occurring.

Specific references for fuller details of the above-explained techniques usable in the encoding and decoding process components of the invention, are:

[ISO 8859-1] ISO/IEC DIS 8859-1.
    8-bit single-byte coded graphic character sets, Part 1: Latin alphabet No. 1. Technical committee/subcommittee: JTC 1/SC 2;

[MIME] Freed, N. and N. Borenstein, "Multipurpose Internet Mail Extensions (MIME) Part One: Format of Internet Message Bodies", RFC 2045, November 1996.

[UNICODE] ISO/IEC 10646-1: 1993.
    Universal Multiple-Octet Coded Character Set (UCS), Part 1: Architecture and Basic Multilingual Plain Technical committee/subcommittee: JTC 1/SC 2

Continuing with the use of the illustrative MPEG audio and video files of FIG. 6, (and later-discussed video files of FIG. 8), for example, and referring to the earlier cited MPEG and MP3 references, the least-significant bits of the magnitude coefficients of the frequency representation of the file are used to encode the program content (so-called magnitude frequency-domain low-bit coding). Depending on the amount of data needed to be encoded in, for example, a music file, data can be stored in a small percentage of the coefficients; say, by only modifying every tenth coefficient, or by using a pseudo- random repeatable sequence to determine which coefficients to modify. When applied to an MP3 format, which uses an additional step of Huffman encoding to compress the data further, the coefficients may be modified before the Huffman encoding, in which case it may slightly increase the file size. Alternatively, and in the preferred embodiment of the invention, the coefficients are modified or re-scaled after the encoding process, as earlier discussed. This avoids increasing the size of the file and also allows the data-extraction process to execute more quickly.

Figure 7:
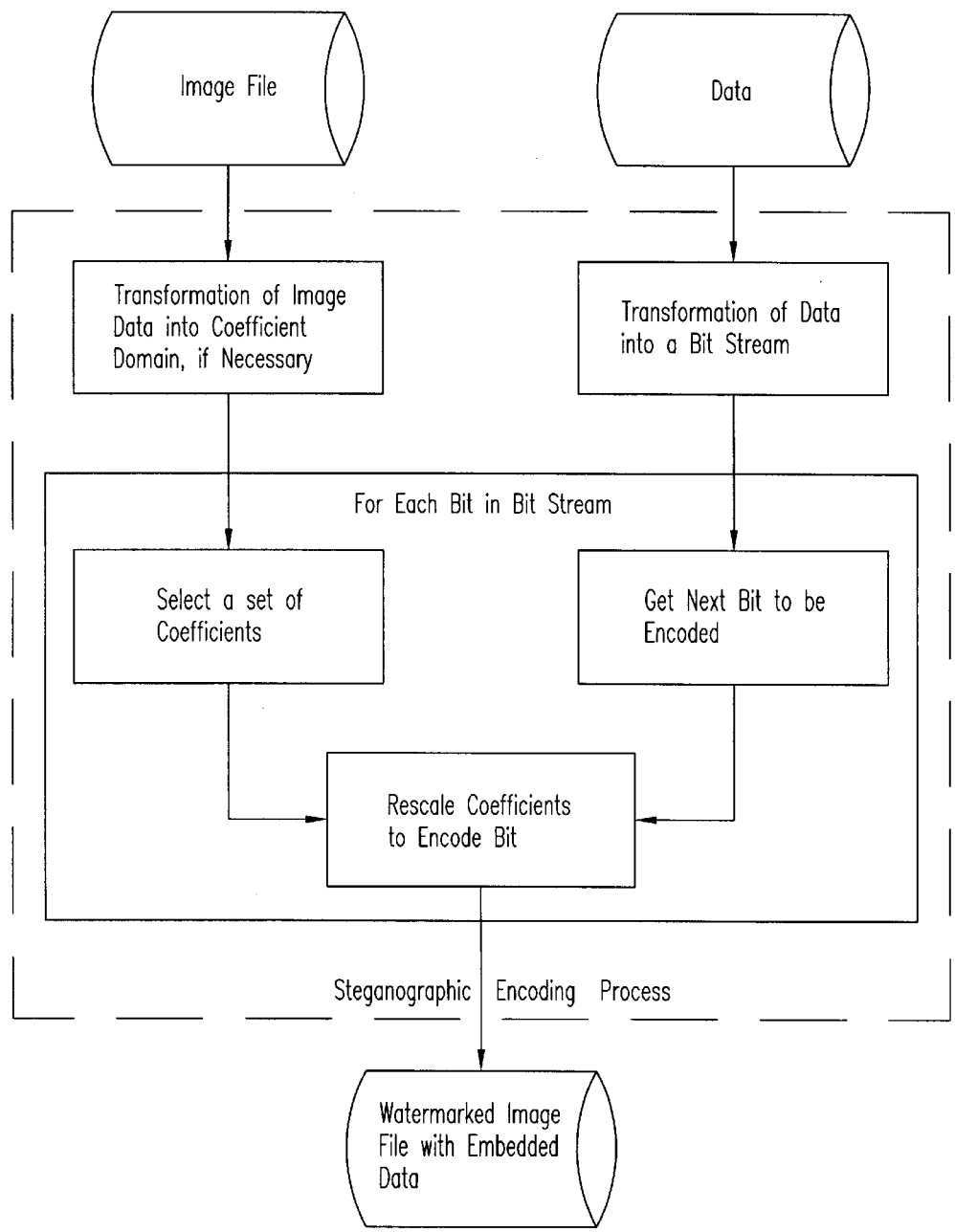
FIGS. 7 and 8 are similar to FIG. 6 but are directed respectively to encoding data in an image and in a video file, again compressed by transformation of the respective image and video data into coefficient domain.

Similarly to the watermarked audio file with embedded data, an image file may be so embedded as shown in FIG. 7. The image file need only be transformed into a coefficient domain, as illustrated, if it has not already been so encoded. If the image file is in a format such as the before-referenced JPEG, which is encoded in the DCT domain, this step is not necessary. Again, the set of coefficients selected, preferably encompasses a wide range of frequencies in the image data. Parity encoding is preferred in the coefficient rescale for data bit encoding, allowing more choice in the coefficients to be modified, as before explained.

Figure 8:
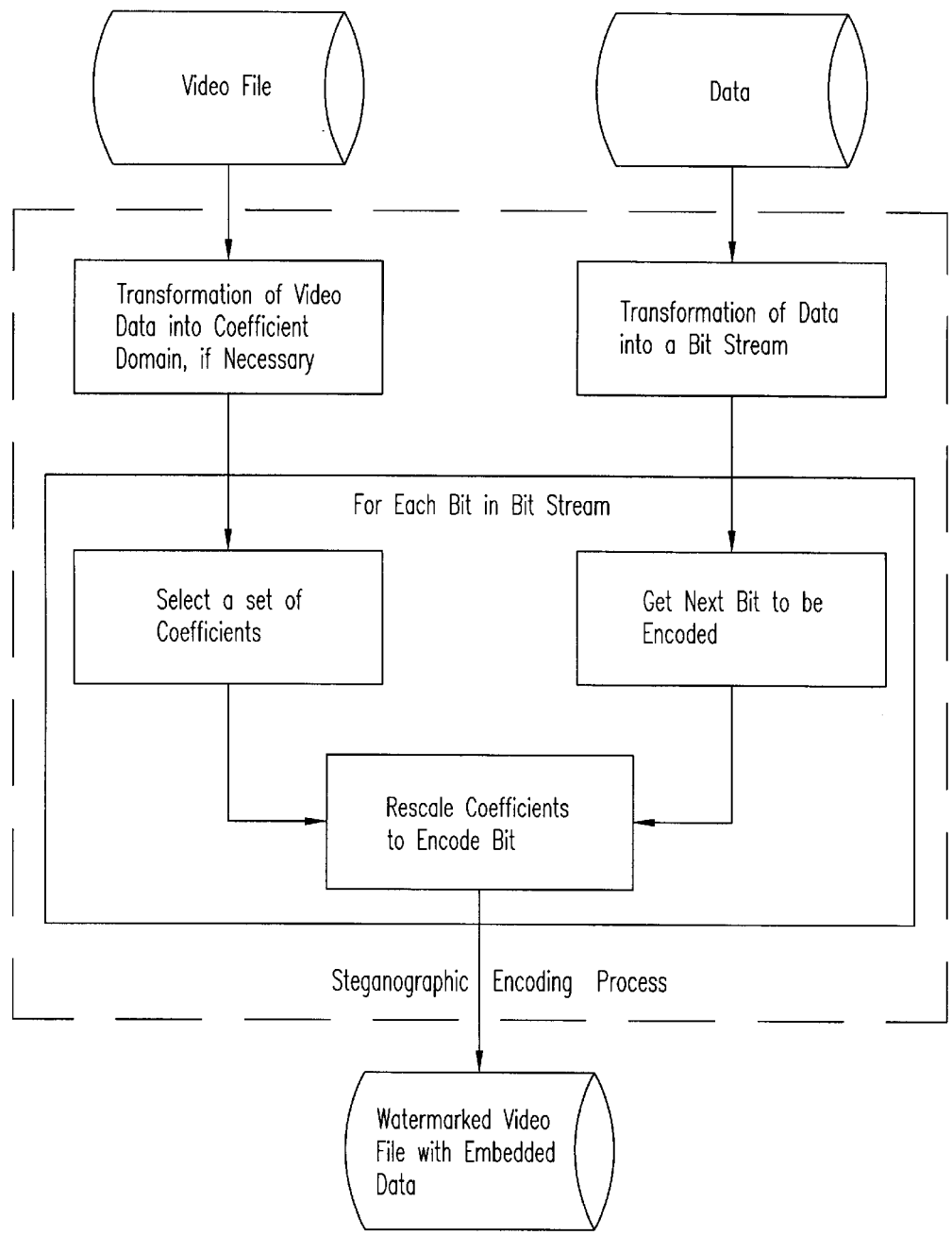

FIG. 8 is similar to FIG. 6, being directed, however, to a transform-compressed video file rather then an audio file.

Figure 9:
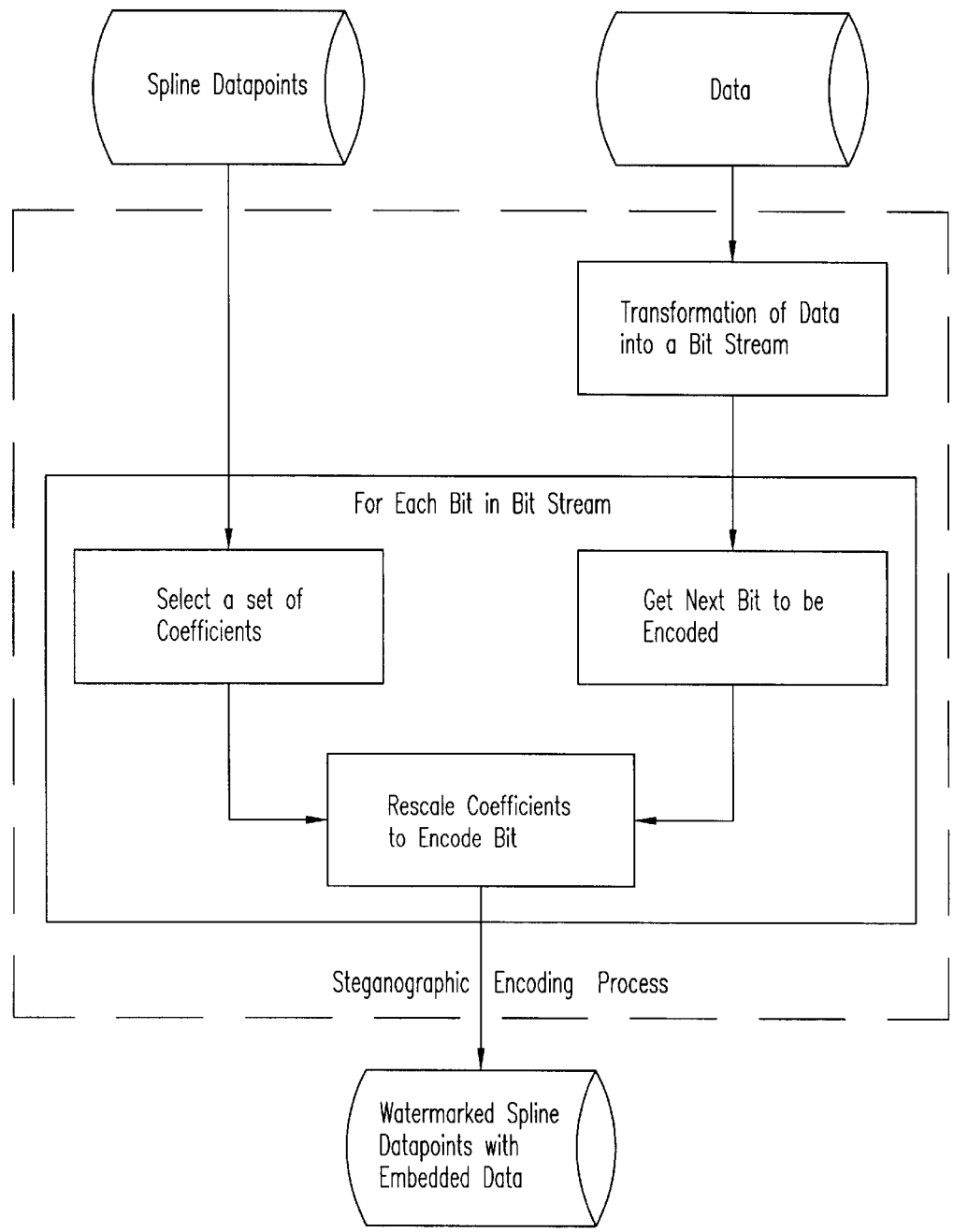
FIG. 9 is a similar diagram applied to the encoding of data in a 2-D or 3-D spline of data points.

The data in coding of FIG. 9 similarly tracks that of FIG. 7, but for 2-D and 3-D spline datapoints such as are used throughout the domain of 3-D modeling. They are already represented using a coefficient representation, encoding coefficients of parametric equations in two and three dimensions. Examples of typical types of such splines include Bezler curves and non-uniform rational B-splines (NURBS). The set of coefficients selected for the data bit stream embedding can be simply a consecutive series of coefficients in the spline datapoints file.

Figure 10:
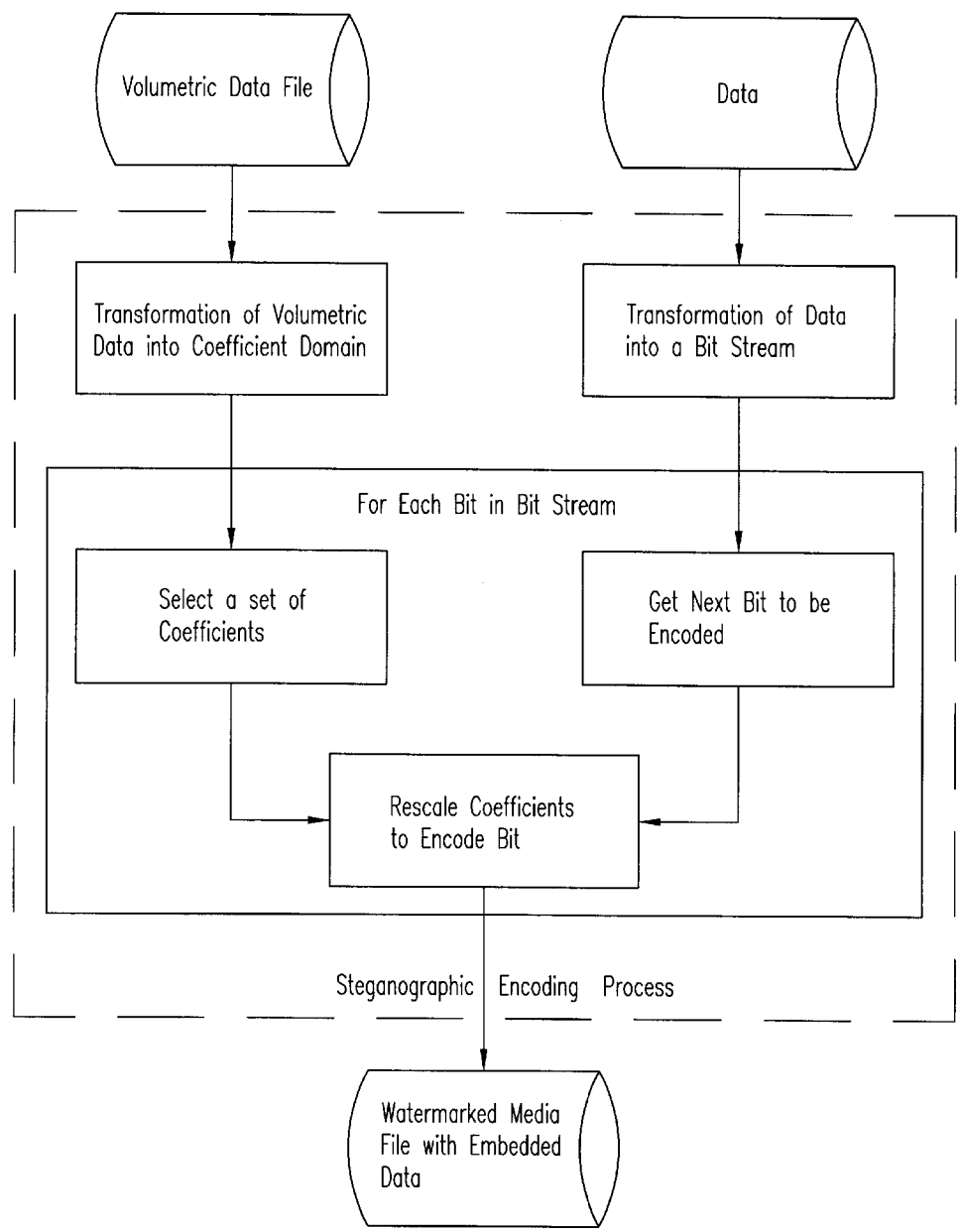
FIG. 10 is directed to the encoding of the data in volumetric data files.

As still is further example of the generic versatility of the invention, FIG. 10 illustrates application of the principles of the invention to encoding supplemental data in volumetric data files. Volumetric data is used to represent spatial data sets using "voxels"—a pixel with a third dimension. Voxels are generally arranged in a 3-D array, and are used as 3-D modeling tools and environments to represent such things as, for example, 3-D spatial models, magnetic resonance imaging (MRI) data, spatial temperature distributions, and the like, etc. Since presently there are no common compression techniques for such volumetric data, transformation into the coefficient domain is required, as shown. This may be done using a well-known 3-D transformation, such as the 3-D DCT or 3-D Fast Fourier Transform.

While the preferred use of least-significant bits of the magnitude or amplitude coefficients of the transform frequency representation of, for example, compressed audio and video files have been discussed, other techniques may also be employed such as phase frequency-domain low-bit coding wherein the least-significant bits of the phase coefficients (FIG. 5) of the transform frequency representation of the media file are used to encode the program. The implementation is the same except for the use of the phase coefficients to encode data as opposed to the magnitude coefficients—and, in the case of audio content, because the human ear is much less sensitive to the phase of sounds than to their loudness, less audible distortion may be encountered in playback.

The Steganographic Systems of FIGS. 12–22

Turning, now, specifically to the emphasis on the specific high-bandwidth measurements, such as taken from analog data streams and the like or from subsampled and/or transformed digital data—the thrust of the present application— these steganographic techniques can be used to embed data in any of the following cases:

A continuous function is sampled at regular intervals

A continuous function is quantized by converting it to a series of digital measurements;

A series of digital measurements is quantized by losing precision;

a series of digital measurements is transformed in a way that introduces aliasing (for example, by rotation of an image or subsampling audio samples to a lower sample rate);

A series of digital measurements is transformed (for example, through frequency-domain signal analysis techniques such as FFT or DCT), resulting in a series of measurements that are then quantized.

The common feature of the above is that they consist of a functional transformation F from a set D of input continuous or discrete data points, into a set of output discrete data points D', with the requirement that some data is lost in this conversion process. The data could be lost through the loss of precision in a temporal or spatial sampling of a real-world value, loss of precision caused by quantizing a digital value, or through the aliasing caused by a discrete transformation such as rotation or scaling. This is to be contrasted from systems of the earlier-mentioned type disclosed, for example, in U.S. Pat. No. 5,889,868, which introduces substantial quantization and dithering error as part of a water marking process. This is intended to prevent an audio file from being modified to remove watermarking data, so it actually adds substantial noise to the file, just enough so if someone were to try to remove a watermarking data, the file would be substantially degraded.

Quantization and aliasing modulation techniques of the present invention allow for high bandwidth data embedded in measurements; being a generalization of the techniques used in our previous patents for coefficient-based embedding of data. It is believed that the quantization modulation is the most generally useful form of this modulation, though aliasing modulation is quite closely related, and is also believed to be novel.

In the technique of the invention, a modified version of D' is created, called $D^{11}$, which is closely related to $D^1$, but has the added feature of encoding a second data stream, E, through the modification or modulation of the quantization and/or aliasing components inherent in the conversion from D to $D^1$.

Before proceeding to a discussion of the preferred embodiments shown in FIGS. 11–22, it is believed useful first to discuss the various underlying operations and functions as used therein.

Modulation of Quantization

As a further illustration of the use of such quantization to encode data, in accordance with the invention, consider a series of eight digital measurements D, made to a precision of 0.1 units:

1.1 2.4 3.5 5.7 6.2 4.9 3.6 2.0

Using the functional transformation Fr which consist of rounding these measurements to the nearest integer, the output $D^1$ is created:

1 2 4 6 6 5 4 2.

Next, examining the quantization error $[D^1-D]$:

0.1 .4 .5 .3 .2 .1 .4 0, it can easily be seen that if, instead of rounding the value 3.5 up to 4, instead it is rounded down to 3, we have added no error to the quantization (it stays at 0.5). Additionally, the two values which have a quantization error of 0.4 may each be rounded the other way, adding only a small amount of quantization error. In a later section, techniques are also discussed by which one can generate a $D^{11}$ which contains the additional data encoding by use of such small changes to $D^1$.

Modulation of Alasing

Using the same eight digital measurements D:

1.1 2.4 3.5 5.7 6.2 4.9 3.6 2.0, a new functional transformation $F_s$ may be chosen, which scales these eight digital measurements down to four. There are several different ways to do this, but perhaps the simplest uses every other value to generate the output $D^1$:

1.1 3.5 6.2 3.6

It should be noted that in each case, we're simply choosing one of the two values.

Another way to perform this transformation would be to choose the other values:

2.4 5.7 4.9 2.0

Or, a third type of transformation would be to average the two values which are being scaled into a single value:

1.75 4.6 5.55 2.8

Any of these three sets of values (or really any of the continuum of interpolated values between them) could reasonably be used as an approximation to the scaling transformation. In the same way as with the quantization modulation described previously, we can choose a $D^{11}$ such that it contains values generated by different types of properly chosen related versions of $F_s$, such as the three versions above. This enables the encoding of data in the aliasing components of the function, without substantially affecting the perceptual experience.

Parity Encoding

With the before-described particular Parity Encoding technique of the invention, information can be embedded in the relationships among a series of digital measurements. Additionally, this technique allows the choosing of exactly which measurement to change, while only minimally affecting the accuracy of the data.

The types of Parity Encoding used in this invention is one of the features of core novelty of this technique, as used herein. This allows such unprecedented data rates without substantially affecting the user's experience.

The closest prior art in this case, as earlier discussed, is least-significant-bit (LSB) encoding of data, but this introduces much more noise compared to our Parity Encoding technique. The combination of our quantization/aliasing techniques with this novel parity encoding creates the real power of the techniques of the present invention.

LSB Parity Encoding

The basic technique of Parity Encoding is to encode data in the parity of a series of digital measurements. For example, in one embodiment of the LSB Parity Encoding, described below, a bit of binary data may be encoded whether the sum of a series of binary measurements is an odd or an even number; encoding a 1 or a 0 bit, respectively.

Illustrating one embodiment of such parity encoding, using the previous data example:

1.1 2.4 3.5 5.7 6.2 4.9 3.6 2.0, and using the previously described quantization function $F_r$, $D^1$ is as follows:

1 2 4 6 6 5 4 2.

The sum of these numbers is 30. Since this is even, it currently encodes a 0 bit. If a 0 bit was what it was desired to encode, we would be done, and could use a $D^{11}$ which was identical to $D^1$. If instead, it was wanted to encode a 1 bit in this series of numbers, we could add one to or subtract one from any of the numbers in $D^1$. Since, as previously described, the number 3.5 is halfway between 3 and 4, and can thus be rounded down instead of up without introducing any additional error, we can create a $D^{11}$ to encode a 1 bit by creating the following $D^{11}$.

1 2 3 6 6 5 4 2.

The sum of these numbers is 29, so they encode a 1 bit. By using a large enough series of such groups of measurements, therefore, this technique can encode multiple bits and arbitrary amounts of digital data.

Introduced Error

This technique may also be used for groups of measurements of varying sizes. Where larger groups of numbers of measurements are used, there is much less error introduced into the data stream. Where there are N measurements, the error is of order $1/N^2$, as earlier pointed out. This can be very simply demonstrated, using the quantization function Fr, as will now be shown.

First, let us assume that the values to be quantized are evenly distributed within the domain, meaning that any of the decimal values are equally likely. This would imply that, for a group of ten measurements, there will be a 65% chance of having a measurement with a decimal value of 0.5, and a 97% chance of having a measurement with a decimal value of 0.4, 0.5, or 0.6. Because we are encoding in the parity of the group of ten values, on average, only half of the groups of values will need to have a value changed. This means that only about 18% of the groups will have any error at all introduced by this method, and in only 1.5% of the cases will these changes add more than the smallest possible amount of error.

Where N measurements are used, there are N possible values which it is possible to modify. If we chose a measurement at random to modify, we would add roughly 1/N noise to the measurements. A novel element of the technique of the invention, however, is that we can choose which measurement to modify, and so can choose one which adds less noise. If these values are evenly (or randomly) distributed, then they will provide on the order of N intermediate values to choose. The combination of these two factors reduces the total amount of introduced noise to the ratio of the before-mentioned $1/N^2$.

Higher-Order Parity Encoding

It is also possible to embed multiple bits in a set of measurements, through the use of higher-order parity extensions of the Parity Encoding technique. For example, where the normal, 1-bit parity looks at the sum of a series of measurements, and uses the sum modulo two (this means the remainder when divided by two), and 2-bit parity uses the sum modulo four. Of all the possible higher-order parity, 2-bit parity is the most useful, since it allows for the same density of data, with more flexibility to determine which measurements will be modified.

Looking at a series of twice as many measurements, starting with the previous example:

1.1 2.4 3.5 5.7 6.2 4.9 3.6 2.0 1.9 1.8 1.9 2.1 2.2 2.9 3.2 3.9, and using the previously described quantization function $F_r$, $D^1$ is as follows.

1 2 4 6 6 5 4 2 2 2 2 2 2 3 3 4.

In the 2-bit Parity Encoding technique, we sum the values (in this example, 50) and look at the sum modulo four, which could be any value from 0 to 3 (in this example). Since we can encode two bits of data in the 2-bit parity, the desired value will also be from 0 to 3.

There are four possible cases that arise in the modification of this 2-parity from the existing value to the desired value: leave the sum unchanged, add one to the sum, subtract one from the sum, and either add two to or subtract two from the sum. In this example, if we want to encode a 2, we could leave it unchanged; for a 3, we would add one; if we wanted to encode a 1, we would subtract one; and for a 0, we would have to either add or subtract two. For this example, let us assume that we would like to encode a 0, so we have to change two measurements.

Where twice as many measurements are used in a group to encode the data, on average only one value will need to be changed. This means that the number of measurements modified per bit encoded remains constant, but added flexibility is gained as to which measurements to modify.

Now let us look at the quantization error, $D^1$-D (here we care about the sign):

−0.1 −0.4 +0.5 +0.3 −0.2 +0.1 +0.4 0 +0.1 +0.2 +0.1 −0.1 −0.2 +0.1 −0.2 +0.1.

If we were using 1-bit parity with two groups of eight measurements, the second set of eight would not have any values which could be easily modified to encode data (none are close to 0.5). However, because we are using 2-bit parity, we can modify the third and seventh values to create the following $D^{11}$, which sums to 52. 52 mod 4 is 0, the value we wanted to encode:

1 2 3 6 6 5 3 2 2 2 2 2 2 3 3 4.

Higher-order parity encodings greater than two may also be used, but they are not as useful, because the data density falls off quickly as these higher-orders are used.

Other types of encoding may also be used with the concepts of the invention, including variable data rate encoding.

Variable Data Rate Encoding

In the variable rate data embedding process of the invention we embed data at higher bit rates, where psycho-perceptual measures show that the relevant portion of the media is more robust to data embedding; and at lower bit rates where the media is more sensitive to the data embedding process. For media with a wide dynamic range (for example, audio files with silences, music, and talking interspersed), it is possible to embed much more data in a media file with our variable rate technique, than by simply embedding data at the highest rate before distortion becomes evident. In the previously described audio examples, this would be done by embedding data at the highest rate where the data embedding adds audible distortion to the silent portions, which currently support the lowest data embedding rates.

Variable data rate encoding, moreover, allows for more data to be embedded in the stream then normally achievable. It can also be applied to other steganographic techniques, as well.

While there are many existing watermarking techniques, as before explained, which only place watermarks in the richer areas of the media, these do not explicitly vary the data encoding rate. Instead, they are limited to only embedding data in the media when certain patterns appear in the frequency, time, or other domains of the data. In addition, because these techniques are only capable of embedding data at fairly low rates, they cannot handle the overhead of switching data rates quickly enough to compensate for rapid dynamic changes in a media.

In accordance with the techniques of the invention, on the other hand, a quite powerful improvement results when combined with perceptual encoding techniques, such as in the before mentioned mpeg algorithm.

Psycho-Perceptual Measures

The psycho-perceptual measures above mentioned and referred to in our said prior applications, can be divided into two general classes of techniques: manual and automatic.

In the manual technique, a trained person examines the media file, and determines which portions of the file can contain more data, and which portions would be adversely affected by placing too much data (or any data) in them. In an audio file, this might be achieved by manually selecting the periods of high-intensity or silence. The manual technique relies on the best psycho-perceptual model of all, a trained human being. This, however, has drawbacks in terms of cost and time. Additionally, the person may not be able manually to compensate for the subtleties of the data embedding process, and may not achieve an optimal data rate embedding.

An automatic technique is to use the encoding algorithm itself to determine which portions of the file contain more data. This is especially useful for encoding algorithms such as the previously described MPEG which incorporate psycho-perceptual measures. For these compression techniques, a simple heuristic is to look at how much compressed data is used to represent the original data. Portions of the file, which require more data to represent, will contain more diverse data, and therefore provide more opportunities for embedding.

Considering the earlier discussed use of an mp3 compression algorithm audio data, for example, the mp3 algorithm performs a DCT on 576 audio samples at a time, applies psycho-acoustic weightings, and then applies a scale factor to the DCT coefficients. The magnitude of these scaled coefficients is a good heuristic to measure the amount of data which it is possible to encode in that portion of the audio stream. This results in a measure computed for each 576-sample portion of the audio stream, generating series of measures, which are smoothed in relation to time (to remove transients), and then a series of piecewise-constant measures are fitted to them, each of which defines portions of the file which can manage a particular destiny of information. It is best to make sure that these portions are long enough that the overhead of changing the density does not overshadow the benefits gained from the variable-rate data embedding.

Data Encapsulation

The data encapsulation for variable bit rates can use a number of common techniques. One such technique is to divide the data file into multiple chunks, each sized to fit in a particular portion of the media file at the designated bit rate. In one embodiment, for example, the first data in the first such chunk may consist of a list of chunk sizes and data rates for all succeeding chunks. The succeeding chunks then encode data as described previously.

"Black Box" Encoding

In certain cases, it is possible to "black box" the data encoding process, so that it is not necessary to modify the internals of the software code which performs the functional transformation. This "black box" works by modifying D such that when transformed, the generated $D^1$ is identical to the desired $D^{11}$.

This technique allows for embedding data in the measurements, semi-independently of the details of the function used to transform the measurements, through an adaptive feedback technique; and it may also be applied to other steganographic techniques, as well.

This can be performed for certain classes of functions, namely those transformations where an operation performed on a sub-part of the data is identical to that operation performed on the whole data (termed "separable" transformations). In other words, choosing an appropriate subset of the measurements and performing the transformation on it, should result in the same values as for those elements in the subset when the transformation is performed on entire set of measurements.

Various types of transformations which can be "black boxed" include:

A continuous function example at regular intervals;

A continuous function is sampled by converting it to a series of digital measurements;

A series of digital measurements is quantized by losing precision;

A series of digital measurements is transformed in a way that introduces aliasing (for example, by rotation of an image or subsampling audio samples to a lower sample rate), where this transformation is separable;

A series of digital measurements is transformed (for example, through frequency-domains signal analysis techniques such as FFT or DCT), where this transformation is separable, resulting in a series of measurements that are then quantized.

Transformations which are not separable and thus cannot be "black boxed", are, for example, types of compression algorithms which use information previously derived from the data stream to encode differential information, or algorithms which compress data differently depending on the degree of filling of a compression pipeline.

"Black-Box" Encoding Technique

The basic technique for black-box embedding is to execute the transformation on the data D, look at the result $D^1$ derived from the data, using a ("possibly simplified") model of the inverse transformation to modify portions of D so that $D^1$ will be closer to the desired $D^{11}$, and then repeating as necessary.

The previous example will be used to demonstrate how this works. Let us first look at D:

1.1 2.4 3.5 5.7 6.2 4.9 3.6 2.0.

The functional transformation $F_r$ outputs $D^1$ as:

1 2 4 6 6 5 4 2.

We want to encode a "1" bit. Since this adds up to 30, we change one value of D to make it add up to 29.

1.1 2.4 3.0 5.7 6.2 4.9 3.6 2.0.

Now, when we re-run the functional transformation $F_r$, we get the right $D^1$, corresponding to the desired $D^{11}$:

1 2 3 6 6 5 4 2.

This is obviously a very simple example, but the technique has wide applicability in cases where the software internals are not so easily accessible.

Pre-Computation for Dynamic Data Embedding

This is suitable mainly for techniques which involve modifying only selected bits of a digital stream. As such, it is very useful for the type of parity encoding technique used in the invention.

In a server-based system where the same file may need to be prepared with many different data files embedded in it, in many cases we can pre-compute the first stages of the embedding. This technique is particularly useful where, for example, an audio file may be delivered with different targeted advertisements embedding in it, depending on user demographics or other information.

This may be accomplished, in accordance with the techniques of the invention, by running the embedding algorithm once, while keeping a separate record of which measurements should be modified, and in which direction.

Using the above running example of D to illustrate this:

1.1 2.4 3.5 5.7 6.2 4.9 3.6 2.0, the functional transformation $F_r$ outputs $D^1$ as follows:

1 2 4 6 6 5 4 2.

For simplicity, we encode a "0" bit in every group of coefficients. We could as easily encode a "1" (or, if we were willing to keep track of what was stored in each group, we could encode different values in each group at this point). Since $D^1$ already encodes a "0" bit, we don't need to change it to generate $D^{11}$:

1 2 4 6 6 5 4 2.

We now store the additional information that, if we need to change this group to represent a "1" bit, we can change the third measurement, by subtracting 1 from it:

3 −1.

When different information is embedded in the same data file, it is straightforward and fast to go through the list of measurements that need to be modified and insert the necessary data, without having to re-analyze the data to determine which measurements must be modified. This technique may also be usable for the dynamic delivery of other sorts of media which need to be dynamically modified for each user, such as executable code, Java, text files, and databases.

Pre-Computation for Variable-Length Encoding

For algorithms, such as mpeg 1 layer 3 (mp3), that employ a variable-length (e.g., Huffman, earlier described) encoding of the measurements, and where it is important that the process maintain a fixed maximum-bit rate, it is necessary to embed data in the modified measurements such that the measurement having the longer length when encoded is used.

As an example, let us use a variable-length encoding table as follows:

| Measurement | Encoding |
|---|---|
| 0 | 1 |
| 1 | 010 |
| 2 | 011 |
| 3 | 00001 |
| 4 | 001 |
| 5 | 00011 |
| 6 | 00010 |

Let us once again use our example of D:

1.1 2.4 3.5 5.7 6.2 4.9 3.6 2.0, with the functional transformation $F_r$ outputting $D^1$ as:

1 2 4 6 6 5 4 2.

Now, since we will be modifying the third coefficient to create $D^{11}$, we need to look at the encoded representation of the two values. The representation of 3 is 00001, and representation of 4 is 001, so we must use the longer, and encode a "1" bit in the data;

1 2 3 6 6 5 4 2.

We now store the additional information that we have encoded a "1" bit; and that, if we need to change this group to represent a "0" bit, we change the third measurement, by adding 1 to it.

1 3 1.

Data Extraction Process

The process of extracting the encoded data is a straight-forward reversal of the encoding process, as earlier described for several embodiments and later also illustrated.

Systems of FIGS. 11–22

Figure 11:
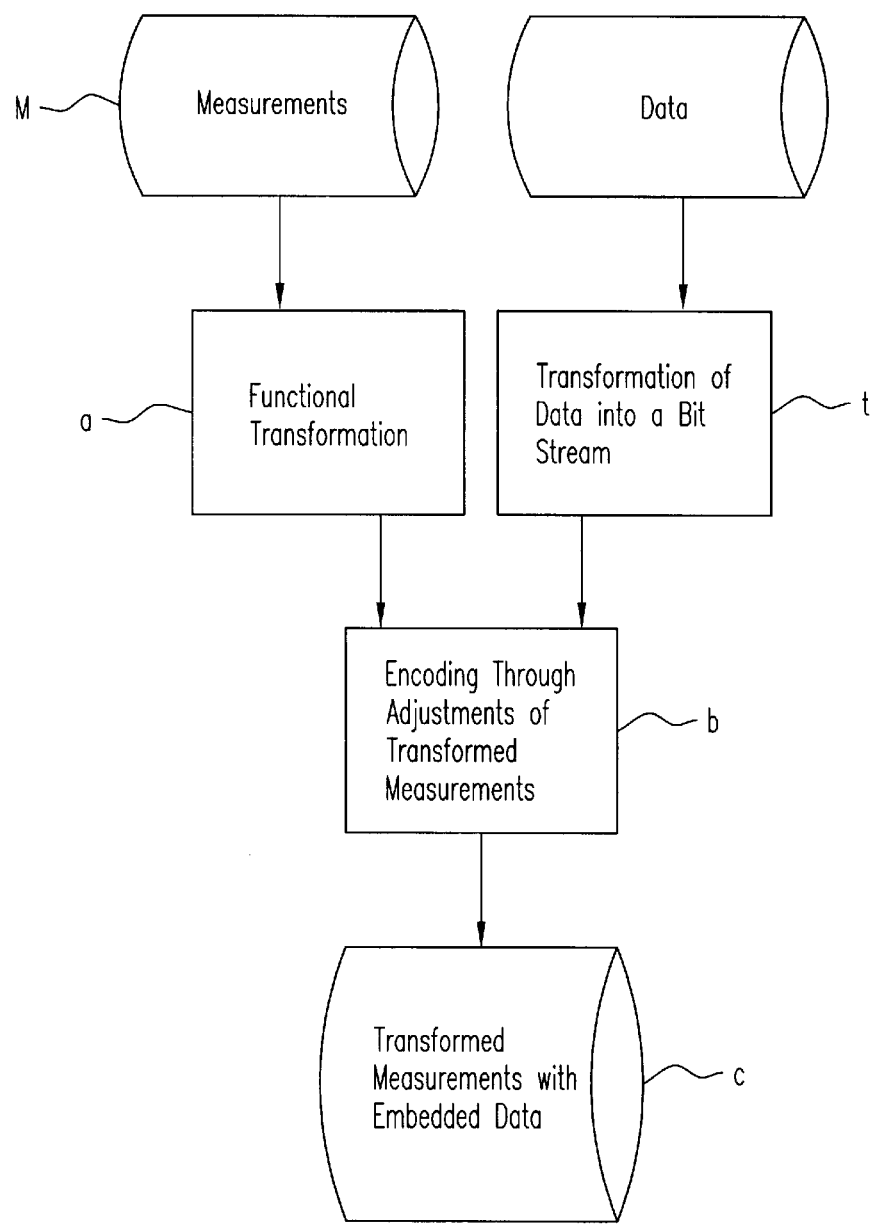
FIG. 11 illustrates the same system overview as FIG. 3 (and FIG. 1), using the more generic terms "measurements" instead of "media file" and "transformed measurements with embedded data", instead of "media file with embedded executable code"

FIG. 11: Data Encoding System Overview

Given a set of measurements and some digital data to embed in these measurements, the basic technique is:

1) Transform the digital data we wish to embed into a series of bits at "t";

2) Apply a functional transformation "a" to the digital measurements M, while keeping the results of the transformation at higher resolution than intended for the final output. Such functional transformations are frequently applied to digital measurements in signal processing, and examples of such transformations, as earlier mentioned, include quantizing, scaling, Fourier, DCT; and 3) Slight adjustments are then made in the transformed measurements at "b", causing each of the bits of digital data to be encoded in the output at the final measurement resolution.

This results in a set of transformed measurements which contain the embedded data at "c".

As earlier explained, this novel operation is superior to prior techniques, such as least-significant-bit embedding, because we introduce step (2), above, and use the results of this step to adjust the measurements in ways which introduce much less noise into the measurements.

FIG. 12: Data Extraction System Overview

Again, given a set of measurements with embedded data, the basic technique to extract the data from the measurements is:

1) Analyze the measurements to extract the data at "d" embedded in step (3) of FIG. 11; and 2) Optionally, verify at "e" that the data is accurate and has not been corrupted.

This is a straightforward reversal of the process in FIG. 11.

FIG. 13: Data Extraction into Media Environment

Where the measurements represent a media file (such as audio, video, 3-D, etc.) and the embedded data is used to provide additional content to the media file playback (such as interactive ads, games, subtitles, etc.), as discussed in our earlier applications and above, it is necessary to extract the data into the media environment "f" (such as a video or audio player). The steps are as follows:

1) Analyze the measurements at "g" to extract the data embedded in step (3) of FIG. 11;
2) Optionally, verify at "h" that the data is accurate and has not been corrupted;
3) Send the media to the viewer or playback device "f";
4) Send the data to a data viewer "i" (for example an advertising window); and
5) Optionally, use timing information to synchronize the media playback with the data as at "possible synchronization".

FIG. 14: Using Watermarking with Encoding

Robust watermarking techniques are used in the prior art, as before explained, to embed low-bandwidth data, such as copyright or authorship information, into data files. These techniques generally work by modifying features of the data which are resilient to signal processing or re-encoding. Since our technique only makes small modifications to the data, it does not affect any existing watermark(s).

Where the data encoding process of the invention is to be used in tandem with robust watermarking techniques, however, it is necessary to:

1) Apply the robust watermarking technique at "j"; and
2) Encode data into the watermarked file, using the data encoding system at FIG. 15: Data Encoding Through Modulation of Quantization Where the functional transformation is one which involves quantization (such as digital sampling, truncation of data, or a frequency transformation which is then quantized, as described above and in our earlier applications), our technique is adapted as follows:

1) Transform the digital data we wish to embed into a series of bits at "t";
2) Apply the transformation which will result in quantization at "a" to the digital measurements, while keeping the results of the transformation at a higher resolution than intended for the final output. For example, a measurement operation may quantize the data, but at a higher precision than will eventually be used.
3) Slight adjustments are then made in the transformed measurements "b", causing each of the bits of digital data to be encoded in the output when quantized at the final measurement resolution at "c".

FIG. 16: Data Encoding Through Modulation of Aliasing

Where the functional transformation is one which involves aliasing (such as scaling, rotation, or subsampling of a series of measurements), our technique is adapted as follows:

1) Transform the digital data we wish to embed into a series of bits at "t":
2) Apply the transformation which will result in aliasing at "a'", to the digital measurements, while generating a range of possible result values. For example, a scaling operation may result in multiple different values, any of which could be assigned to specify value, depending on the filtering operation to used when scaling; and
3) One of the result values, or an interpolated value generated from the result values, is used, which causes each of the bits of digital data to be encoded at "b'" in the output "c".

FIG. 17: Parity Encoding

As before discussed, Parity Encoding as used herein is a core novelty of this technique, with its precise version of the data determining which bits to modify in the LSB encoding. This is what allows such unprecedented data rates to be obtained with the invention without substantially affecting the user's experience, and allows the embedding of data at very high bit rates, without substantially affecting the quality of the measurements. As outlined in the encoding flow chart of FIG. 17, bits of data at very high encoded in the parity relationships among a set of those measurements. This also permits choosing the measurement which is easiest to change, in which to embed the data.

1) Get the next bit of data to embed (I);
2) If there is more data, continue. Otherwise, leave all remaining measurements unaltered and terminate (II);
3) Choose a subset of the measurements in which to embed the data (III);
4) Compute the parity of these measurements (IV) (that is, add their values up, and determine if the sum is odd or even);
5) If the parity already encodes (V) the bit of data, then back to step (I);
6) Otherwise, select the simplest member to modify (VI) (as described in the quantization and aliasing modulation sections previously);
7) Change this value to embed the data (VII); and
8) Repeat starting at step I.

FIG. 18: Variable Data Rate Encoding

Where the measurements in which we are embedding data have a wide dynamic range, it may, as earlier stated, be appropriate to embed data at variable rates. The process of doing this is as follows:

1) Manually or automatically determine ("l") which portions of the measurements can encode more data without disrupting the user's experience. Manually, this involves a trained person making these decisions. Automatic techniques were earlier more fully described in the accompanying text;
2) Define contiguous regions ("m") of the measurements which can encode at given rate;
3) Possibly smooth these regions ("n") and fit them together, to optimize the amount of data necessary to describe these regions (if there too short, it will take more data to describe them than if they were not used at all);
4) The description of these data density regions is joined together without the data bit stream "t", encapsulated at "o" to be embedded in the measurements; and
5) The encapsulated data is then embedded ("p"), as previously described.

FIG. 19: Black-Box Encoding

As before explained, this technique allows us to embed data in the measurements, semi-independently of the details of the function used to transform the measurements, through an adaptive feedback technique.

Where it is not possible to modify the internals of the functional transformation, it may be useful to encode data by modifying the measurements before applying the transformation. This requires a (possibly simplified) model of the transformation, which is used to anticipate what changes in the measurements may result in the data being encoded. This process may need to be run multiple times so that the model converges on a set of modifications which successfully encode the desired data:

1) Transform the digital data ("t") we wish to embed into a series of bits;
2) Using a (possibly simplified) model of the functional transformation, apply changes to the measurements which should result in the digital data being encoded in the data stream at "q";
3) Apply the functional transformation ("r");
4) Determine if the data is properly encoded at "s"; and
5) If the data is not properly encoded, refine the modifications to the measurements in step 2 at "q", and repeat FIG. 20: Pre-Computation for Dynamic Embedding It was previously described that pre-computation for data embedding may be suitable mainly for techniques which involve modifying only selected bits of the digital stream. As such, it is very useful for the type of parity encoding technique of the invention.

In FIG. 20, this is shown effected as follows:

1) Apply a functional transformation "a" to the digital measurements, while keeping the results of the transformation at a higher resolution than intended for the final output;
2) Slight adjustments are then made at "b" in the transformed measurements, causing the same bit (either 1 or 0 for the whole file) of data digital to be encoded in the output at the final measurement resolution;
3) The resulting measurements are saved for later use at "u", along with the information on which measurements were modified and in which direction;
4) Later, at "t", we transform the digital data we wish to embed into a series of bits; and
5) Finally, the stored list of measurements are modified at "v" to encode the digital data, using the saved information on how the measurements had been modified.

FIG. 21: Pre-Computation for Variable-Length Encoding

For compression techniques, such as the earlier discussed mpeg encoding, where it is necessary to maintain a fixed maximum bit rate, it is necessary, as also earlier explained, to modify this technique slightly:

1) Apply a functional transformation to the digital measurements at "a", while keeping the results are the transformation at a higher resolution than intended for the final output;
2) Determine whether encoding a 0 bit or a 1 bit will result in a larger encoded segment at "b". Choose the larger bit. Slight adjustments are then made in the transformed measurements, causing this bit to be encoded in the output at the final measurement resolution;
3) The resulting measurements are saved at "u" for later use, along with the information on which measurements were modified and in which direction, to encode which bit;
4) Later, we transform the digital data we wish to embed into a series of bits at "t";
5) Finally, the stored list of measurements is modified at "w" to encode the digital data, using the saved information on how the measurements had been modified. If the desired data is identical to the bit used to encode the data, no modification is necessary; and
6) Null padding is introduced at "x" if the encoded output is shorter than before.

FIG. 22: Parity Decoding

The decoding technique for Parity Encoding is, as earlier described, a simple reversal, and can be used for any of the previously described encoding techniques. This can be used as the component to extract embedded data from measurements, as described, for example, in FIGS. 12 and 13.

As shown in the flow chart of FIG. 22:

1) Get the next set of measurements at VIII. If there are no more, we are finished:
2) Compute the parity of these set of measurements at 1X by determining if their sum is odd or even. Based on parity, determine the bit value (for example, odd means 1 and even means 0); and
3) Output the Bit to a bit stream at X', where it is transformed back into the original data; and
4) Repeat starting at step 1. (VIII)

Further modifications will occur to those skilled in this art, and such are considered to fall within the spirit and scope of the present invention as defined in the appended claims.

What is claimed is:

1. The method of steganographically embedding substantial supplemental digital data in a series of digital measurements derived from one of an analog data stream and subsampled and/or transformed digital data, that comprises, deriving such series of digital measurements through functional transformation from a set of input data converted into a set of output data of successive quantized and/or aliased components; transforming the substantial supplemental digital data into a series of successive bits; and introducing the successive bits into the quantized and/or aliased components to modulate from a few percent to a substantial percentage of the successive components through but slight adjustments of the same, thereby to embed the supplemental data in from a few percent to a substantial percentage of the series of digital measurements without substantially affecting the quality thereof.

2. The method of claim 1 wherein the measurements represent a media file, and the embedded supplemental data provides additional content to the media file format in playback without changing that format.

3. The method of claim 2 wherein the additional content is selected from the group consisting of an added high-bandwidth digital channel, ads, interactive ads, games, additional program materials, and subtitles and the media is audio, image or video.

4. The method of claim 2 wherein the supplemental data is embedded in from at least about 2 to about 9 percent of the media file content.

5. The method of claim 1 wherein the embedding is effected with least significant-bit parity encoding arranged to choose which measurement or component or coefficient representing the same is to be modified and by which bit, while only minimally affecting the accuracy.

6. The method of claim 5 wherein the choosing is selected for one or both of minimum noise and psycho-perceptual measures.

7. The method of claim 5 wherein only selected bits of the digital stream are modified as determined by pre-computation of the data embedding.

8. The method of claim 1 wherein the embedding is effected by an encoding technique selected from the group consisting of parity encoding, higher-order parity encoding, variable data rate and variable length encoding, and black-box encoding.

9. The method of claim 8 wherein the encoding technique is black-box encoding and wherein the embedding in the measurements is effected semi-independently of the details of the function used to transform the measurements, through use of adaptive feedback.

10. The method of claim 1 wherein the encoded measurement data is extracted by straightforward reversal of the encoding process.

11. The method of claim 1 wherein the functional transformation is selected from the group consisting of Fourier, Cosine, Sine and Wavelet transforms providing series of coefficient representations of the measurement data.

12. The method of claim 11 wherein the low bits of coefficients of the transformed and quantized and/or aliased series of measurements are modified by embedding successive of the supplemental data bits therein.

13. The method of claim 12 wherein the choosing of the coefficients to be so modified is effected from psycho-perceptual information.

14. The method of claim 1 wherein the series of measurements are selected from the group consisting of media file formatted data; audio waveform for measurements such as PCM algorithms, compressed audio files such as mp3; image value measurements such as a scanned image, a fax, or a compressed image file such as JPEG; time-varying image value measurements such as a digitized movie or compressed video files such as mpeg; and data consisting of a series of physical measurements such as machine control data, process monitoring and temperature or pressure measurements.

15. The method of claim 1 wherein the functional transformation is effected from a set D of input continuous or discrete data points into a set $D^1$ of output discrete data points, and creating a modified version $D^{11}$ closely related to $D^1$ but having the added feature of encoding a second or supplemental data bit stream therein through the modifying or modulating of the quantization and/or aliasing components inherent in the conversion from D to $D^1$ with the bits of the supplemental data bit stream, and with only minimal and insignificant affecting of the accuracy of the data.

16. The method of claim 15 wherein the input data is derived from a media file format, and the modifying or modulating involved in the encoding and embedding of the supplemental data is effected with such sufficiently small changes in $D^1$ as not substantially to affect the perceptual experience in playing back the encoded data.

17. The method of claim 1 wherein from about 3 to about 25 percent of the successive components are modulated with supplemental data bits.

18. Apparatus for steganographically embedding substantial supplemental digital data in a series of digital measurements derived from one of an analog data stream and subsampled and/or transformed digital data, having, in combination, functional transformation means for deriving such series of digital measurements from a set of input data converted into a set of output data of successive quantized and/or aliased components; means for transforming the substantial supplemental digital data into a series of successive bits; and encoder means for introducing the successive bits into the quantized and/or aliased components to modify from a few percent to a substantial percentage of the successive components through but slight adjustments of the same, thereby to embed the supplemental data in from a few to a substantial percentage of the series of digital measurements without substantially affecting the quality thereof.

19. The apparatus of claim 18 wherein the measurements represent a media file and the embedded supplemental data provides additional content to the media file format in playback without substantially changing that format.

20. The apparatus of claim 19 wherein the additional content is selected from the group consisting of added high bandwidth digital channels, ads, interactive ads, games, additional program materials, and subtitles and the media is audio, image or video.

21. The apparatus of claim 19 wherein the supplemental data is embedded from at least about 2 to about 9 percent of the media file content.

22. The apparatus of claim 19 wherein the embedding is effected with least-significant-bit parity encoding means arranged to choose which measurement or component or coefficient representing the same is to be modified and by which bit, while only minimally affecting the accuracy.

23. The apparatus of claim 22 wherein the choosing is selected for one or both of minimum noise and psycho-perceptual measures.

24. The apparatus of claim 22 wherein only selected bits of the digital stream are modified as determined by means for effecting pre-computation of the data embedding.

25. The apparatus of claim 23 wherein the encoding means is variable data rate encoding means responsive to psycho-perceptual measures to embed data at higher bit rates for the more robust portion of the media file, and at lower bit rates where the media file is more sensitive to the data embedding.

26. The apparatus of claim 25 wherein the media file is an audio file containing silent portions, and means is provided for embedding the data at the highest rate where the data embedding adds audible distortion to the silent portions.

27. The apparatus of claim 18 wherein the embedding is effected by an encoding means selected from the group consisting of encoders for parity encoding, higher-order parity encoding, variable data rate and variable length encoding, and black-box encoding.

28. The apparatus of claim 27 wherein the encoder is a black-box encoder wherein the embedding in the measurements is effected semi-independently of the details of the functional transformation means used to transform the measurements, through use of adaptive feedback means.

29. The apparatus of claim 18 wherein a decoder is provided adapted to extract the encoded measurement data by straightforward reversal of the encoding process effected by the encoder means.

30. The apparatus of claim 18 wherein from about 3 to about 25 percent of the successive components are modulated with supplemental data bits.

31. In a series of digital measurements derived from one of an analog data stream and subsampled and/or transformed digital data, a method of steganographically embedding substantial supplemental digital data representing from a few percent to a substantial percent of the series of digital measurements into the same, that comprises, deriving such series of digital measurements through functional transformation from a set of input data converted into a set of output data of successive quantized and/or aliased components; transforming the substantial supplemental digital data into a series of successive bits; and introducing the successive bits into the quantized and/or aliased components to modulate successive components through but slight adjustments of the same, thereby to embed the supplemental data in the series of digital measurements without substantially affecting the quality thereof, wherein the measurements represent a media file, and the embedded supplemental data provides additional content to the media file format in playback without changing that format and wherein the additional content is selected from the group consisting of an added high-bandwidth digital channel, ads, interactive ads, games, additional program materials, and subtitles and the media is audio, image or video, and further wherein the embedding is effected with least significant-bit parity encoding arranged to choose which measurement or component or coefficient representing the same is to be modified and by which bit, while only minimally affecting the accuracy.

32. The method of claim 31 wherein the measurements represent a media file and the supplemental data is embedded in from at least about 2 to about 9 percent of the media file content.

33. The method of claim 31 wherein from about 3 to about 25 percent of the successive components are modulated with supplemental data bits.

34. The method of claim 31 wherein the measurements represent an audio media file and said successive bits are introduced at rates of the order of thousands of bits per second and more into a media file encoded on the order of 100 kilobits per second and higher.

35. The method of steganographically embedding substantial supplemental digital data into a series of digital measurements representing a media file containing audio content derived from one of an analog data stream and subsampled and/or transformed digital data, that comprises, deriving such series of digital measurements through functional transformation from a set of input data converted into a set of output data of successive quantized and/or aliased components; transforming the substantial supplemental digital data into a series of successive bits; and introducing the successive bits at rates of the order of thousands of bits/second and more into the quantized and/or aliased components of the file to modulate successive components through but slight adjustments of the same, thereby to embed the supplemental data in the series of digital measurements of the media file without substantially affecting the quality thereof.

36. The method of claim 35 wherein the embedding is effected with least significant-bit parity encoding arranged to choose which measurement or component or coefficient representing the same is to be modified and by which bit, while only minimally affecting the accuracy.

* * * * *